United States Patent
Pan

(10) Patent No.: US 11,429,950 B2
(45) Date of Patent: Aug. 30, 2022

(54) MOBILE PAYMENT APPARATUS AND METHOD

(71) Applicant: Huawei Technologies Co., Ltd., Shenzhen (CN)

(72) Inventor: Shilin Pan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1109 days.

(21) Appl. No.: 15/388,813

(22) Filed: Dec. 22, 2016

(65) Prior Publication Data
US 2017/0103378 A1    Apr. 13, 2017

Related U.S. Application Data

(63) Continuation of application No. PCT/CN2015/092098, filed on Oct. 16, 2015.

(30) Foreign Application Priority Data

Apr. 24, 2015  (CN) .......................... 201510201343.9

(51) Int. Cl.
*G06Q 20/32* (2012.01)
*G06F 21/57* (2013.01)
(Continued)

(52) U.S. Cl.
CPC ......... *G06Q 20/3226* (2013.01); *G06F 21/57* (2013.01); *G06Q 20/3227* (2013.01);
(Continued)

(58) Field of Classification Search
CPC .......... G06Q 20/3226; G06Q 20/3829; G06Q 20/401; H04L 9/3236; H04L 2209/56; H04L 2209/80
See application file for complete search history.

(56) References Cited

U.S. PATENT DOCUMENTS 9,520,995 B2 * 12/2016 Pulkus ...................... G06F 7/72
9,979,703 B2 *  5/2018 Warnez ..................... G06F 8/65
(Continued)

FOREIGN PATENT DOCUMENTS

CN    102325210 A    1/2012
CN    102656599 A    9/2012
(Continued)

OTHER PUBLICATIONS

D. Park, M. Di Yin and J. Cho, "Secure Microcontroller with On-Chip Hierarchical Code Validator for Firmware Authentication," 2014 International Conference on IT Convergence and Security (ICITCS), 2014, pp. 1-3.*

(Continued)

*Primary Examiner* — Steven S Kim
(74) *Attorney, Agent, or Firm* — Conley Rose, P.C.

(57) ABSTRACT

A mobile payment apparatus includes a communication unit configured to exchange payment information with a communication peer end using a radio link, a memory configured to store mobile payment software, a SE, including a first storage module and a processor, and at least one CPU configured to execute general operating system software. The processor is configured to load the mobile payment software from the memory to the first storage module and exchange the payment information with the communication unit under action of the mobile payment software. The first storage module is configured to provide memory space for executing the mobile payment software for the processor. The SE and the at least one CPU are located in a first semiconductor chip.

26 Claims, 7 Drawing Sheets

(51) Int. Cl.
*H04W 4/80* (2018.01)
*G06Q 20/38* (2012.01)
*G06Q 20/40* (2012.01)
*H04L 9/32* (2006.01)
*H04W 12/08* (2021.01)
*H04W 12/45* (2021.01)

(52) U.S. Cl.
CPC ..... *G06Q 20/3229* (2013.01); *G06Q 20/3278* (2013.01); *G06Q 20/3829* (2013.01); *G06Q 20/401* (2013.01); *H04L 9/3236* (2013.01); *H04W 4/80* (2018.02); *H04L 2209/56* (2013.01); *H04L 2209/80* (2013.01); *H04W 12/08* (2013.01); *H04W 12/45* (2021.01)

(56) References Cited

U.S. PATENT DOCUMENTS

| | | | |
|---|---|---|---|
| 2005/0182952 | A1 | 8/2005 | Shinozaki |
| 2006/0255128 | A1 | 11/2006 | Johnson et al. |
| 2010/0217709 | A1 | 8/2010 | Aabye et al. |
| 2011/0078081 | A1* | 3/2011 | Pirzadeh ............... G06Q 20/20 705/44 |
| 2013/0128664 | A1* | 5/2013 | Ihle ....................... G11C 11/005 365/185.05 |
| 2014/0012762 | A1 | 1/2014 | Glatt |
| 2014/0019216 | A1 | 1/2014 | Jo |
| 2014/0020114 | A1 | 1/2014 | Bhatia et al. |
| 2014/0266601 | A1 | 9/2014 | Narendra et al. |
| 2014/0286492 | A1 | 9/2014 | Vasudevan |
| 2014/0298026 | A1* | 10/2014 | Isozaki ................. H04L 9/0825 713/171 |
| 2014/0306004 | A1 | 10/2014 | Park et al. |
| 2014/0324698 | A1 | 10/2014 | Dolcino et al. |
| 2015/0052064 | A1 | 2/2015 | Karpenko et al. |
| 2016/0132861 | A1 | 5/2016 | A) Fontaine et al. |
| 2018/0012037 | A1* | 1/2018 | Warnez ................ G06F 21/604 |

FOREIGN PATENT DOCUMENTS

| | | | |
|---|---|---|---|
| CN | 103544599 | A | 1/2014 |
| CN | 103793815 | A | 5/2014 |
| CN | 104145285 | A | 11/2014 |
| CN | 203966188 | U | 11/2014 |
| CN | 104778794 | A | 7/2015 |
| JP | 2005227995 | A | 8/2005 |
| JP | 2010055332 | A | 3/2010 |
| JP | 2015513738 | A | 5/2015 |
| JP | 2016525254 | A | 8/2016 |
| KR | 20130058527 | A | 6/2013 |
| KR | 20140009744 | A | 1/2014 |
| KR | 20140124254 | A | 10/2014 |
| KR | 20140137400 | A | 12/2014 |
| WO | 2015009765 | A1 | 1/2015 |
| WO | 2015018511 | A1 | 2/2015 |

OTHER PUBLICATIONS

D. Arora, A. Raghunathan, S. Ravi, M. Sankaradass, N. K. Jha and S. T. Chakradhar, "Exploring Software Partitions for Fast Security Processing on a Multiprocessor Mobile SoC," in IEEE Transactions on Very Large Scale Integration (VLSI) Systems, vol. 15, No. 6, pp. 699-710, Jun. 2007.*
Machine Translation and Abstract of Korean Publication No. KR20130058527, Jun. 4, 2013, 15 pages.
Foreign Communication From a Counterpart Application, Korean Application No. 10-2017-7006993, Korean Office Action dated Dec. 12, 2017, 9 pages.
Foreign Communication From a Counterpart Application, Korean Application No. 10-2017-7006993, English Translation of Korean Office Action dated Dec. 12, 2017, 7 pages.
Foreign Communication From a Counterpart Application, Japanese Application No. 2017-516493, Japanese Notice of Rejection dated Mar. 6, 2018, 4 pages.
Foreign Communication From a Counterpart Application, Japanese Application No. 2017-516493, English Translation of Japanese Notice of Rejection dated Mar. 6, 2018, 5 pages.
Foreign Communication From a Counterpart Application, Chinese Application No. 2015102013439, Chinese Search Report dated Oct. 18, 2016, 2 pages.
Foreign Communication From a Counterpart Application, Chinese Application No. 201510201343.9, Chinese Office Action dated Nov. 3, 2016, 3 pages.
Foreign Communication From a Counterpart Application, PCT Application No. PCT/CN2015/092098, English Translation of International Search Report dated Jan. 26, 2016, 2 pages.
Foreign Communication From a Counterpart Application, PCT Application No. PCT/CN2015/092098, Written Opinion dated Jan. 26, 2016, 2 pages.
Foreign Communication From a Counterpart Application, Brazilian Application No. BR112016024967-4, Brazilian Office Action dated Oct. 1, 2018, 7 pages.
Foreign Communication From a Counterpart Application, Korean Application No. 10-2017-7006993, Korean Office Action dated Oct. 10, 2019, 9 pages.
Foreign Communication From a Counterpart Application, Korean Application No. 10-2017-7006993, English Translation of Korean Office Action dated Oct. 10, 2019, 7 pages.
"Mobile Station Modem," XP0079071 15, CDMA Technologies, MSM3100,2000, 2 pages.
Reveilhac, M., et al., "Promising Secure Element Alternatives for NFC Technology," XP031500082, First International Workshop on Near Field Communication, Feb. 24, 2009, pp. 75-80.
Foreign Communication From a Counterpart Application, European Application No. 15888732.3, Extended European Search Report dated Apr. 28, 2017, 10 pages.

* cited by examiner

MOBILE PAYMENT APPARATUS AND METHOD

CROSS-REFERENCE TO RELATED APPLICATIONS

This application is a continuation of International Application No. PCT/CN2015/092098, filed on Oct. 16, 2015, which claims priority to Chinese Patent Application No. 201510201343.9, filed on Apr. 24, 2015. The disclosures of the aforementioned applications are hereby incorporated by reference in their entireties.

TECHNICAL FIELD

The present disclosure relates to the field of mobile communication, and in particular, to a mobile payment apparatus and method.

BACKGROUND

Mobile payment refers to a service manner in which a user is allowed to use a mobile terminal such as a mobile phone or a tablet computer of the user to make payment for a consumed commodity or service. Currently, there are three manners for implementing mobile payment using a mobile terminal, which are respectively, a secure digital (SD) card solution, a subscriber identity module (SIM) solution, and a terminal-based solution combining near field communication (NFC) with a SE (SE). Currently, the terminal-based solution combining NFC with a SE is gradually becoming a mainstream choice for implementing a mobile payment solution.

An existing terminal-based solution is shown in FIG. 1. A mobile terminal 10 communicates with a point of sale (POS) machine 11 using a NFC unit 101 in the mobile terminal 10. A short distance radio communication link 12 between the NFC unit 101 and the POS machine 11 is a bidirectional path and can be implemented using various suitable short distance radio communication protocols so as to implement a basic radio communication function for mobile payment. For example, the communication link 12 may be used to transmit POS instruction data and the like from the POS machine 11 to the NFC unit 101 in the mobile terminal 10. A SE 102 may be a component coupled to an independent central processing unit (CPU) 103 configured to execute various functions related to a financial payment service and store data such as a key or a certificate that is related to a bank service. In a transaction, the SE 102 receives the POS instruction data from the NFC unit 101, parses the instruction data, and makes a corresponding response according to a financial transaction protocol. The response is fed back by the NFC unit 101 to the POS machine 11, to complete data transmission in mobile payment, so that the mobile terminal 10 is used as a transaction verification card. The CPU 103 executes operating system software 1031, for example, ANDRIOD system software, and the CPU 103 is configured to control the NFC unit 101 and the SE 102, for example, control turning-on or turning-off of the NFC unit 101 and the SE 102. In addition, the mobile terminal 10 may include an input unit 104. The input unit 104 may be a touch screen configured to exchange messages with a user using a user interface (UI) so that the user may input an operation instruction into the input unit 104 using the UI to instruct the operating system software 1031 and related application software to perform a related operation, for example, confirming a transaction or inputting a personal transaction password. The POS machine 11, as a terminal device for performing a transaction, is connected to a cloud server 14 on a network side using the Internet so that a payment service is computed and completed using the server 14. The server 14 on the network side is generally executed by a bank.

The terminal-based solution may include online payment and offline payment. In offline payment, as shown in FIG. 1, contactless card reading is performed between the mobile terminal 10 and the POS machine 11, for example, a mobile phone is read, and the NFC unit 101 and the SE 102 act together to complete a payment transaction. Online payment may be implemented without using the NFC unit 10. In this case, the CPU 103 and the SE 102 can be connected to the Internet through a mobile communication network, to implement online payment. In this case, the SE 102 achieves a purpose equivalent to that of a bank universal serial bus (USB) key and is configured to store and verify a bank certificate. Therefore, the NFC unit 101 in FIG. 1 is optional. Referring to FIG. 1, when online payment is performed, the mobile terminal 10 may further include a mobile communication unit 105 configured to function in place of the NFC unit 101 when offline payment is performed. The mobile communication unit 105 is connected to a radio access network (RAN) 15, and a base station in the RAN 15, and is connected to the Internet through the RAN 15. The Internet is connected to the server 14 located in the Internet, so that the server 14 receives instruction data or transmits information to the SE 102. The SE 102 parses the instruction data and makes a corresponding response according to the financial transaction protocol, so that the mobile communication unit 105 transmits the data to the server 14 on a network side through the mobile Internet. In this case, the mobile communication unit 105 may be a unit executing a cellular radio communication protocol, and is configured to connect the mobile terminal 10 to the Internet using a cellular radio communication link 13. The mobile communication unit 105 may execute a cellular radio communication protocol such as the Global System for Mobile Communications (GSM), the Universal Mobile Telecommunications System (UMTS), Worldwide Interoperability for Microwave Access (WiMAX) or Long Term Evolution (LTE), to implement a mobile Internet function of the mobile terminal 10.

Currently, in solutions used by various mobile terminals, the SE 102 is disposed outside a primary system. As shown in FIG. 1, the CPU 103 and the mobile communication unit 105 may be located on one integrated circuit substrate, for example, integrated into a central chip 106. The SE 102 is a chip independent of the central chip 106. The SE 102 communicates with the CPU 103 in the central chip 106 using a serial peripheral interface (SPI). However, the SE 102 is disposed outside the central chip 106, resulting in the SE 102 and the central chip 106 occupying a large area on a main board of the mobile terminal 10, and a higher cost is required.

SUMMARY

Embodiments of the present disclosure provide a mobile payment apparatus and method that may reduce a cost and area for implementation of mobile payment hardware.

According to a first aspect, an embodiment of the present disclosure provides a mobile payment apparatus including a communication unit configured to exchange payment information with a communication peer end using a radio link, a memory configured to store mobile payment software, a SE including a first storage module and a processor, and at least one CPU configured to execute general operating system software and control at least one of the communication unit, the memory, or the SE under action of the general operating system software. The processor is configured to load the mobile payment software from the memory to the first storage module, execute the mobile payment software, and exchange the payment information with the communication unit under action of the mobile payment software. The first storage module is configured to provide memory space for executing the mobile payment software for the processor, where the SE and the at least one CPU are located in a first semiconductor chip in the mobile payment apparatus. The SE and the at least one CPU are integrated using the first semiconductor chip. Therefore, costs and an area for implementation of mobile payment hardware are reduced. Optionally, the communication unit may include a baseband unit. The communication unit may further include a radio frequency unit.

With reference to the first aspect, in a first possible implementation manner of the first aspect, the memory is located in a second semiconductor chip in the mobile payment apparatus. Because the first semiconductor chip is independent of the second semiconductor chip, the storage unit storing the mobile payment software may not be integrated with the SE executing the mobile payment software, which may reduce difficulty and complexity of hardware implementation. For example, for reasons such as a process and an area, it may be difficult to integrate a current memory with the first chip including a CPU. In this solution, the SE may be integrated with the CPU and an off-chip memory may be used, which may be suitable for a mobile payment solution.

With reference to the first possible implementation manner of the first aspect, in a second possible implementation manner of the first aspect, the memory includes a secure storage region and a common storage region that are isolated from each other, where the secure storage region is used to store the mobile payment software, and the common storage region is used to store the general operating system software. The processor is configured to load the mobile payment software from the secure storage region in the memory to the first storage module. The at least one CPU is configured to read the general operating system software from the common storage region in the memory and execute the general operating system software. The memory is reused for both the general operating system software and the mobile payment software so that the general operating system software and the mobile payment software coexist in one memory and are securely isolated from each other, which may save memory resources on the premise of ensuring security.

With reference to the first possible implementation manner of the first aspect, in a third possible implementation manner of the first aspect, the memory is dedicated to storage of the mobile payment software. The mobile payment apparatus further includes a common storage unit, where the common storage unit is located in a third semiconductor chip in the mobile payment apparatus and the common storage unit is configured to store the general operating system software. The at least one CPU is configured to read the general operating system software from the common storage unit and execute the general operating system software. In the implementation manner, the dedicated memory that is specific for storage of the mobile payment software may be physically isolated from the common storage unit so that operational security may be further improved.

With reference to the first aspect or any one of the first to third possible implementation manners of the first aspect, in a fourth possible implementation manner of the first aspect, the mobile payment software includes mobile payment operating system software. Secure and reliable mobile payment operating system software is used in the mobile payment software, which can ensure operational security and also help implement more types of mobile payment application software using the mobile payment operating system software as a platform, for example, to support of services of different banks. Optionally, the mobile payment operating system software is a chip operating system (COS) mirror.

With reference to the fourth possible implementation manner of the first aspect, in a fifth possible implementation manner of the first aspect, the mobile payment software further includes at least one type of mobile payment application software. A larger quantity of mobile payment application software helps extend a mobile payment service to more different service providers, for example, different banks or commercial organizations.

With reference to the fourth or fifth possible implementation manner of the first aspect, in a sixth possible implementation manner of the first aspect, the SE further includes a second storage module configured to store a startup program for initiating the processor. When the SE is powered on, the processor is configured to read the startup program from the second storage module, load the mobile payment operating system software from the memory to the first storage module under action of the startup program, and execute the mobile payment operating system software. Because a startup program for initiating the SE is located in an independent second storage module in the SE, startup security of the SE may be increased.

With reference to the fifth possible implementation manner of the first aspect, in a seventh possible implementation manner of the first aspect, the processor is configured to load one or more types of mobile payment application software of the at least one type of mobile payment application software from the memory to the first storage module upon being triggered by the payment information exchanged between the processor and the communication unit, and execute the one or more types of mobile payment application software. Because the loading and executing of the mobile payment application software is triggered by the exchanged payment information, when there is no payment service, related mobile payment application software may be not started which may save memory space of the first storage module. In a case in which the SE is highly integrated, space of the first storage module may be very limited, and the present solution may achieve a cost-saving effect.

With reference to the first aspect or any one of the first to seventh possible implementation manners of the first aspect, in an eighth possible implementation manner of the first aspect, the payment information includes a mobile payment instruction that is transmitted from the communication peer end to the processor via the communication unit and mobile payment data transmitted from the processor to the communication peer end via the communication unit in response to the mobile payment instruction. Therefore, the payment information involves a bidirectional communication process in mobile payment.

With reference to the eighth possible implementation manner of the first aspect, in a ninth possible implementation manner of the first aspect, the mobile payment data includes data resulting from security processing and the security processing includes at least one of data encryption or data integrity protection. Because security processing is performed on the mobile payment data, when the mobile payment apparatus is configured to perform mobile payment, security of the mobile payment data sent to the communication peer end may be more secure.

With reference to the ninth possible implementation manner of the first aspect, in a tenth possible implementation manner of the first aspect, the processor is further configured to generate the data resulting from security processing. Because the processor includes a security processing process, the security processing process is more centralized on the processor, and additional security hardware is not needed, which can reduce a cost.

With reference to the ninth possible implementation manner of the first aspect, in an eleventh possible implementation manner of the first aspect, the processor is further configured to generate original data. The SE further includes a security processing module configured to perform the security processing on the original data to generate the data resulting from security processing. The security processing module independent of the processor is used to perform security processing, thereby implementing acceleration of security processing and further optimizing implementation of the processing. Optionally, the security processing module may be a hardware accelerator.

With reference to the first aspect or any one of the first to eleventh possible implementation manners of the first aspect, in a twelfth possible implementation manner of the first aspect, the control performed by the at least one CPU on the at least one of the communication unit, the memory, or the SE includes controlling of turning-on, turning-off, entry into or exit from a low power state or a working state. Optionally, the at least one CPU may be an advanced reduced instruction set computing (RISC) machine (ARM) processor. The at least one CPU may control execution of another unit in a system in general.

With reference to the first aspect or any one of the first to twelfth possible implementation manners of the first aspect, in a thirteenth possible implementation manner of the first aspect, the communication unit is a NFC unit, the communication peer end is a payment terminal, and the NFC unit is configured to exchange the payment information with the payment terminal by executing a short distance radio communication protocol. In this solution, mobile payment is performed using the NFC unit and the payment terminal, for example, a POS machine. Optionally, the NFC unit includes a NFC baseband unit configured to execute the short distance radio communication protocol. The NFC unit further includes a NFC radio frequency unit configured to receive or send a radio frequency signal, where the radio frequency signal is converted by the NFC radio frequency unit into a baseband signal that can be processed by the NFC baseband unit, and the radio frequency signal includes the payment information.

With reference to the thirteenth possible implementation manner of the first aspect, in a fourteenth possible implementation manner of the first aspect, the NFC unit is located in the first semiconductor chip or is located in a fourth semiconductor chip in the mobile payment apparatus. When the NFC unit is located in the first semiconductor chip, high integration of the NFC unit, the SE, and the at least one CPU can be implemented, and an implementation cost can be reduced. When the NFC unit is located in a fourth semiconductor chip, design difficulty caused by the need of integrating the NFC unit can be reduced.

With reference to the first aspect or any one of the first to twelfth possible implementation manners of the first aspect, in a fifteenth possible implementation manner of the first aspect, the communication unit is a mobile communication unit, the communication peer end is a RAN, and the mobile communication unit is configured to exchange the payment information with the RAN by executing a cellular radio communication protocol. This solution helps implement a secure payment function by means of mobile communication. Optionally, the mobile communication unit includes a mobile communication baseband unit used in the cellular radio communication protocol. The mobile communication unit further includes a mobile communication radio frequency unit configured to receive or send a radio frequency signal, where the radio frequency signal is converted by the mobile communication radio frequency unit into a baseband signal that can be processed by the mobile communication baseband unit and the radio frequency signal includes the payment information.

With reference to the fifteenth possible implementation manner of the first aspect, in a sixteenth possible implementation manner of the first aspect, the mobile communication unit is located in the first semiconductor chip or is located in a fifth semiconductor chip in the mobile payment apparatus. When the mobile communication unit is located in the first semiconductor chip, high integration can be implemented, and an implementation cost can be reduced. When the mobile communication unit is located in a fifth semiconductor chip, design difficulty caused by integration can be reduced.

With reference to the first aspect or any one of the first to sixteenth possible implementation manners of the first aspect, in a seventeenth possible implementation manner of the first aspect, the SE further includes a cipher engine configured to perform security verification on the mobile payment software after the processor loads the mobile payment software from the memory to the first storage module and instruct the processor to execute the mobile payment software after the security verification succeeds, where the security verification includes at least one of security decryption or hash check. Optionally, the cipher engine may be a hardware accelerator. Because the cipher engine is independent of the processor in the SE, and is dedicated to implementation of a security verification function, the mobile payment software can be executed after verification succeeds, which may ensure that the mobile payment software is not tampered before being executed and may improve processing performance when security verification is performed.

With reference to the seventeenth possible implementation manner of the first aspect, in an eighteenth possible implementation manner of the first aspect, the cipher engine is further configured to perform at least one type of processing in security encryption or first hash operation processing on update data to obtain processed update data. The processor is further configured to write the processed update data to the memory to update the mobile payment software. When the mobile payment software is updated, the cipher engine performs processing so that related software is verified when the updated mobile payment software is subsequently read again, which may ensure that the mobile payment software is not tampered with and may ensure security of software needing to be updated better.

With reference to the first aspect or any one of the first to sixteenth possible implementation manners of the first aspect, in a nineteenth possible implementation manner of the first aspect, the processor is further configured to perform security verification on the mobile payment software after the processor loads the mobile payment software from the memory to the first storage module and execute the mobile payment software after the security verification succeeds, where the security verification includes at least one of security decryption or first hash check. Because the processor already has the security verification function, the processor does not need an additional unit to implement the function, which reduces design difficulty.

With reference to the nineteenth possible implementation manner of the first aspect, in an twentieth possible implementation manner of the first aspect, the processor is further configured to perform at least one type of processing in security encryption or first hash operation processing on update data, to obtain processed update data, and write the processed update data to the memory, to update the mobile payment software. When the mobile payment software needs to be updated, the processor may further perform security processing on the software needing to be updated, so that related software is verified when the updated mobile payment software is subsequently read again, which implements integration of more functions in the processor.

With reference to the eighteenth or twentieth possible implementation manner of the first aspect, in a twenty-first possible implementation manner of the first aspect, the processor is further configured to perform second hash operation processing on the processed update data using a key to obtain data to be stored when the processor writes the processed update data to the memory. The memory is further configured to perform second hash check on the data to be stored, obtain the processed update data after the second hash check succeeds and update the mobile payment software using the processed update data. Because the processor has the capability described above, data written to the memory may be verified by the memory, which may ensure security of the data written to the memory.

With reference to the eighteenth or twentieth possible implementation manner of the first aspect, in a twenty-second possible implementation manner of the first aspect, the processor is further configured to send the processed update data to the at least one CPU when the processor writes the processed update data to the memory. The at least one CPU is further configured to perform second hash operation processing on the processed update data in a trusted execution environment using a key to obtain data to be stored and send the data to be stored to the memory, where the trusted execution environment is securely isolated from the general operating system software. The memory is further configured to perform second hash check on the data to be stored, obtain the processed update data after the second hash check succeeds, and update the mobile payment software using the processed update data. In this solution, when the update data is written from the processor to the memory, the update data is transferred using the trusted execution environment of the at least one CPU and hash processing is performed on the update data in the trusted execution environment so that the memory performs corresponding hash check. Because the trusted execution environment is more trustworthy than the general operating system software, security of the data written to the memory can be improved.

With reference to the twenty-second possible implementation manner of the first aspect, in a twenty-third possible implementation manner of the first aspect, the SE further includes a third storage module. The processor is further configured to write the processed update data to the third storage module and send a first interrupt request to the at least one CPU. The at least one CPU is further configured to read the processed update data from the third storage module in the trusted execution environment in response to the first interrupt request.

With reference to the first aspect or any one of the first to twenty-third possible implementation manners of the first aspect, in a twenty-fourth possible implementation manner of the first aspect, the at least one CPU is further configured to execute common application software except for the mobile payment software. The at least one CPU is a commonly used general CPU in a mobile terminal and helps extend the solution on a common mobile terminal.

With reference to the first aspect or any one of the first to twenty-fourth possible implementation manners of the first aspect, in a twenty-fifth possible implementation manner of the first aspect, the general operating system software executed by the at least one CPU is securely isolated from the SE. Because the isolation exists, the general operating system software cannot randomly access the SE, which can improve security of mobile payment.

With reference to the first aspect, or any one of the first to seventeenth possible implementation manners, the nineteenth possible implementation manner, the twenty-fourth possible implementation manner, and the twenty-fifth possible implementation manner of the first aspect, in a twenty-sixth possible implementation manner of the first aspect, the processor is further configured to perform second hash operation processing on update data or an erase instruction using a key to obtain a processing result. The memory is further configured to perform second hash check on the processing result, obtain the update data or the erase instruction after the second hash check succeeds, and update the mobile payment software using the update data or erase data that corresponds to the erase instruction from the memory according to the erase instruction. This solution improves security of data erasure in mobile payment.

With reference to the first aspect or any one of the first to seventeenth possible implementation manners, the nineteenth possible implementation manner, the twenty-fourth possible implementation manner, and the twenty-fifth possible implementation manner of the first aspect, in a twenty-seventh possible implementation manner of the first aspect, the processor is further configured to send update data or an erase instruction to the at least one CPU. The at least one CPU is further configured to perform second hash operation processing on the update data or the erase instruction in a trusted execution environment using a key to obtain a processing result and send the processing result to the memory, where the trusted execution environment is securely isolated from the general operating system software. The memory is further configured to perform second hash check on the processing result, obtain the update data or the erase instruction after the second hash check succeeds, and update the mobile payment software using the update data or erase data that corresponds to the erase instruction from the memory according to the erase instruction. This solution improves security of data erasure in mobile payment, and the CPU implements security processing, which simplifies a design of the processor.

According to a second aspect, an embodiment of the present disclosure provides a method for implementing mobile payment using a mobile payment apparatus, including executing general operating system software and controlling at least one of a communication unit or a SE under action of the general operating system software using at least one CPU, loading mobile payment software from a memory to the SE, executing the mobile payment software in the SE, and exchanging, by the SE, payment information with the communication unit under action of the mobile payment software, where the communication unit exchanges the payment information with a communication peer end using a radio link, where the SE and the at least one CPU are located in a first semiconductor chip in the mobile payment apparatus. The SE and the at least one CPU are integrated using the same semiconductor chip; therefore, costs and an area for implementation of mobile payment hardware may be reduced.

According to a third aspect, an embodiment of the present disclosure provides a semiconductor chip, used in a mobile payment apparatus, where the semiconductor chip includes a SE and at least one CPU, where the SE includes a first storage module and a processor, the first storage module is configured to provide memory space for executing mobile payment software for the processor, and the at least one CPU is configured to execute general operating system software. The processor is configured to load the mobile payment software from a memory in the mobile payment apparatus to the first storage module, execute the mobile payment software, and exchange payment information with a communication unit in the mobile payment apparatus under action of the mobile payment software. The at least one CPU is further configured to control at least one of the communication unit, the memory, or the SE under action of the general operating system software.

With reference to the third aspect, in a first possible implementation manner of the third aspect, the mobile payment software includes mobile payment operating system software.

With reference to the first possible implementation manner of the third aspect, in a second possible implementation manner of the third aspect, the mobile payment software further includes at least one type of mobile payment application software.

With reference to the first or second possible implementation manner of the third aspect, in a third possible implementation manner of the third aspect, the SE further includes a second storage module configured to store a startup program for initiating the processor. When the SE is powered on, the processor is configured to read the startup program from the second storage module, load the mobile payment operating system software from the memory to the first storage module under action of the startup program, and execute the mobile payment operating system software.

With reference to the second possible implementation manner of the third aspect, in a fourth possible implementation manner of the third aspect, the processor is configured to load one or more types of mobile payment application software of the at least one type of mobile payment application software from the memory to the first storage module upon being triggered by the payment information exchanged between the processor and the communication unit and execute the one or more types of mobile payment application software.

With reference to the third aspect or any one of the first to fourth possible implementation manners of the third aspect, in a fifth possible implementation manner of the third aspect, the payment information includes a mobile payment instruction that is transmitted from the communication peer end to the processor via the communication unit and mobile payment data transmitted from the processor to the communication peer end via the communication unit in response to the mobile payment instruction.

With reference to the fifth possible implementation manner of the third aspect, in a sixth possible implementation manner of the third aspect, the mobile payment data includes data resulting from security processing. The security processing includes at least one of data encryption or data integrity protection.

With reference to the sixth possible implementation manner of the third aspect, in a seventh possible implementation manner of the third aspect, the processor is further configured to generate the data resulting from security processing.

With reference to the sixth possible implementation manner of the third aspect, in an eighth possible implementation manner of the third aspect, the processor is further configured to generate original data. The SE further includes a security processing module configured to perform the security processing on the original data to generate the data resulting from security processing.

With reference to the third aspect or any one of the first to eighth possible implementation manners of the third aspect, in a ninth possible implementation manner of the third aspect, the control performed by the at least one CPU on the at least one of the communication unit, the memory, or the SE includes controlling of turning-on, turning-off, entry into or exit from a low power state or a working state.

With reference to the third aspect or any one of the first to tenth possible implementation manners of the third aspect, in an eleventh possible implementation manner of the third aspect, the SE further includes a cipher engine configured to perform security verification on the mobile payment software after the processor loads the mobile payment software from the memory to the first storage module and instruct the processor to execute the mobile payment software after the security verification succeeds, where the security verification includes at least one of security decryption or hash check.

With reference to the eleventh possible implementation manner of the third aspect, in a twelfth possible implementation manner of the third aspect, the cipher engine is further configured to perform at least one type of processing in security encryption or first hash operation processing on update data, to obtain processed update data. The processor is further configured to write the processed update data to the memory to update the mobile payment software.

With reference to the third aspect or any one of the first to tenth possible implementation manners of the third aspect, in a thirteenth possible implementation manner of the third aspect, the processor is further configured to perform security verification on the mobile payment software after the processor loads the mobile payment software from the memory to the first storage module and execute the mobile payment software after the security verification succeeds, where the security verification includes at least one of security decryption or first hash check.

With reference to the thirteenth possible implementation manner of the third aspect, in a fourteenth possible implementation manner of the third aspect, the processor is further configured to perform at least one type of processing in security encryption or first hash operation processing on update data to obtain processed update data and write the processed update data to the memory to update the mobile payment software.

With reference to the twelfth or fourteenth possible implementation manner of the third aspect, in a fifteenth possible implementation manner of the third aspect, the processor is further configured to perform second hash operation processing on the processed update data using a key to obtain data to be stored when the processor writes the processed update data to the memory. The memory is further configured to perform second hash check on the data to be stored, obtain the processed update data after the second hash check succeeds, and update the mobile payment software using the processed update data.

With reference to the twelfth or fourteenth possible implementation manner of the third aspect, in a sixteenth possible implementation manner of the third aspect, the processor is further configured to send the processed update data to the at least one CPU when the processor writes the processed update data to the memory. The at least one CPU is further configured to perform second hash operation processing on the processed update data in a trusted execution environment using a key to obtain data to be stored and send the data to be stored to the memory, where the trusted execution environment is securely isolated from the general operating system software. The memory is further configured to perform second hash check on the data to be stored, obtain the processed update data after the second hash check succeeds, and update the mobile payment software using the processed update data.

With reference to the sixteenth possible implementation manner of the third aspect, in a seventeenth possible implementation manner of the third aspect, the SE further includes a third storage module. The processor is further configured to write the processed update data to the third storage module, and send a first interrupt request to the at least one CPU. The at least one CPU is further configured to read the processed update data from the third storage module in the trusted execution environment in response to the first interrupt request.

With reference to the third aspect or any one of the first to seventeenth possible implementation manners of the third aspect, in an eighteenth possible implementation manner of the third aspect, the at least one CPU is further configured to execute common application software except for the mobile payment software.

With reference to the third aspect or any one of the first to eighteenth possible implementation manners of the third aspect, in a nineteenth possible implementation manner of the third aspect, the general operating system software executed by the at least one CPU is securely isolated from the SE.

With reference to the third aspect, or any one of the first to eleventh possible implementation manners, the thirteenth possible implementation manner, the eighteenth possible implementation manner, and the nineteenth possible implementation manner of the third aspect, in a twentieth possible implementation manner of the third aspect, the processor is further configured to perform second hash operation processing on update data or an erase instruction using a key to obtain a processing result. The memory is further configured to perform second hash check on the processing result, obtain the update data or the erase instruction after the second hash check succeeds, and update the mobile payment software using the update data or erase data that corresponds to the erase instruction from the memory according to the erase instruction.

With reference to the third aspect or any one of the first to eleventh possible implementation manners, the thirteenth possible implementation manner, the eighteenth possible implementation manner, and the nineteenth possible implementation manner of the third aspect, in a twenty-first possible implementation manner of the third aspect, the processor is further configured to send update data or an erase instruction to the at least one CPU. The at least one CPU is further configured to perform second hash operation processing on the update data or the erase instruction in a trusted execution environment using a key to obtain a processing result and send the processing result to the memory, where the trusted execution environment is securely isolated from the general operating system software. The memory is further configured to perform second hash check on the processing result, obtain the update data or the erase instruction after the second hash check succeeds, and update the mobile payment software using the update data or erase data that corresponds to the erase instruction from the memory according to the erase instruction.

In the technical solutions provided in the embodiments of the present disclosure, when security of mobile payment is ensured, costs and an area for implementation of hardware can be reduced, a requirement for miniaturization of a mobile terminal in mobile payment is better met, and mobile payment is conveniently popularized and expanded.

BRIEF DESCRIPTION OF DRAWINGS

To describe the technical solutions in the embodiments of the present disclosure more clearly, the following briefly describes the accompanying drawings for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
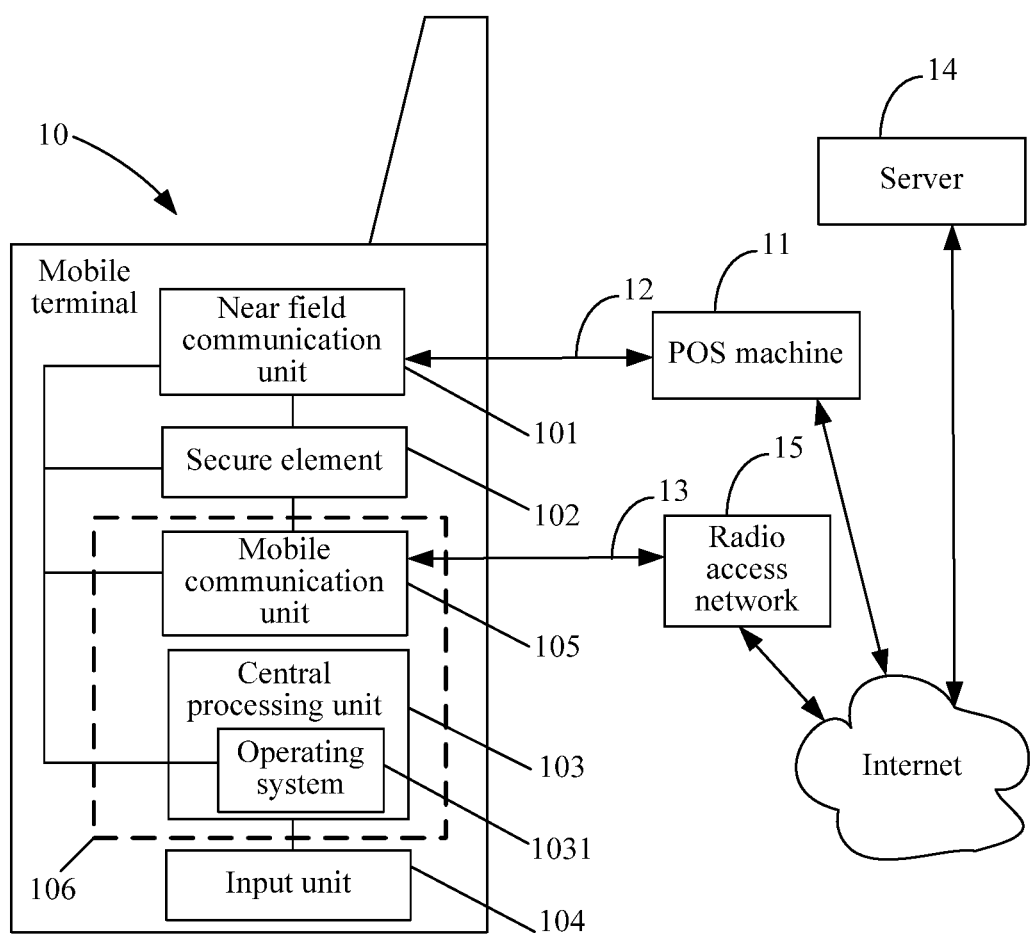
FIG. 1 is a simplified schematic diagram of a structure of a mobile terminal used in mobile payment.
Figure 2:
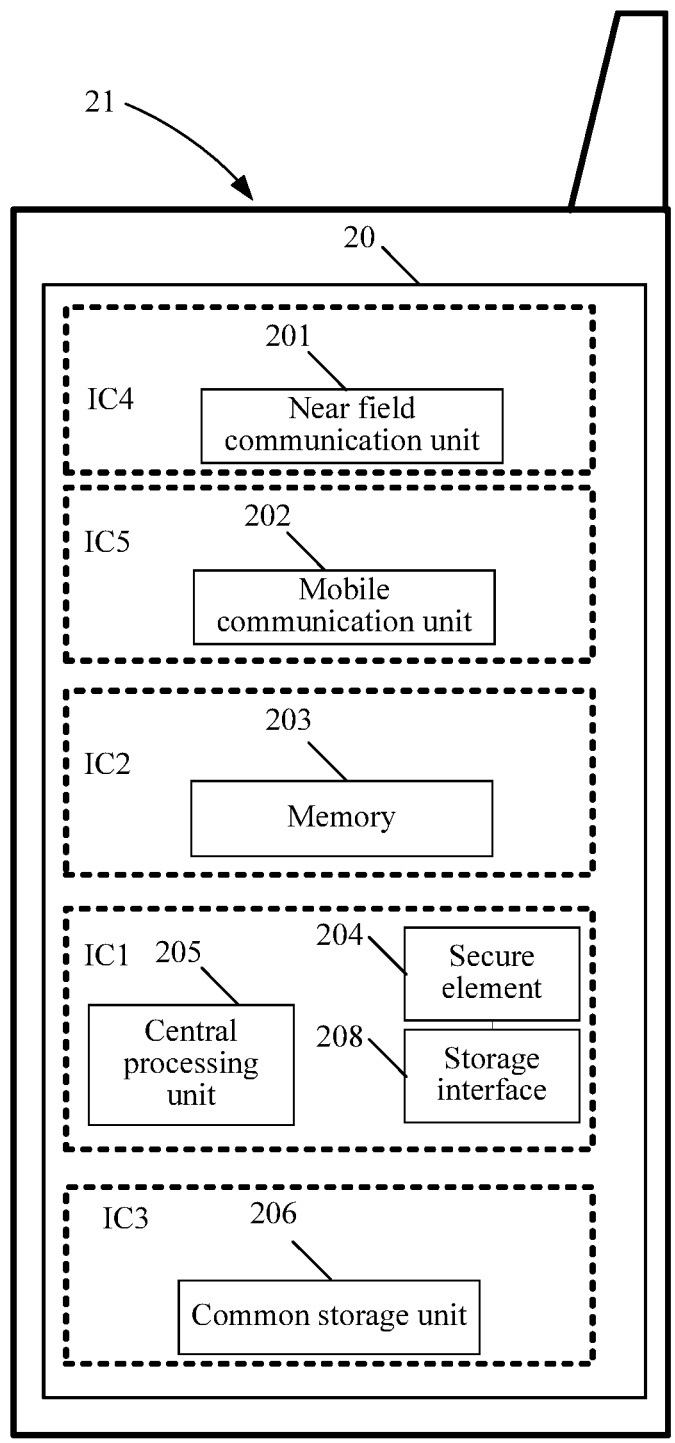
FIG. 2 is a simplified schematic diagram of a structure of a mobile payment apparatus according to an embodiment of the present disclosure.

FIG. 2 is a schematic diagram of a mobile payment apparatus 20 according to an embodiment of the present disclosure. The mobile payment apparatus 20 may be located in a mobile terminal 21. The mobile terminal 21 may be user equipment (UE), for example, various types of portable terminal devices such as a mobile phone and a tablet computer. The mobile payment apparatus 20 may be a chip, a chip set, or a circuit board carrying a chip or a chip set. The chip, the chip set, or the circuit board carrying a chip or a chip set may work when being driven by necessary software. The mobile payment apparatus 20 may include a NFC unit 201, where the NFC unit 201 exchanges, by executing a short distance radio communication protocol, payment information with a payment terminal, for example, a POS machine, that is located outside the mobile terminal 21 and that is configured to connect to the Internet to implement a mobile payment function, to implement offline payment. The mobile payment apparatus 20 may also include a mobile communication unit 202, where the mobile communication unit 202 exchanges payment information with a RAN, for example, a base station in the RAN, by executing a cellular radio communication protocol so as to connect to the Internet through the RAN including the base station so that the mobile communication unit 202 exchanges payment information with a server, which has a payment function, in the Internet to implement online payment. It may be understood that the mobile payment apparatus 20 may include either the NFC unit 201 or the mobile communication unit 202, for example, either offline payment or online payment may be implemented. A radio frequency identification (RFID) technology that may be used in the short distance radio communication protocol executed by the NFC unit 201 may support various types of RFID protocols such as a European Computer Manufacturers Association (ECMA) standard protocol. In addition, the radio frequency identification technology may also support other types of short distance communication protocols such as a BLUETOOTH communication protocol, an infrared communication protocol, and a Wireless Fidelity (WiFi) protocol. The cellular radio communication protocol executed by the mobile communication unit 202 may be any one or more of cellular radio communication protocols such as GSM, UMTS, WiMAX, or LTE, so that communication with a RAN in a cellular mobile communication network is implemented using the mobile communication unit 202. It may be understood that the base station in the RAN is a network element which implements the communication function in the RAN and the base station may have multiple forms, such as a NodeB or an eNodeB. The RAN including the base station is connected to a server in the network, for example, a server on a cloud side, so that the server exchanges payment information with the mobile payment apparatus 20. The NFC unit 201 or the mobile communication unit 202 may include a baseband unit executing a communication protocol. Optionally, the NFC unit 201 or the mobile communication unit 202 may further include a radio frequency unit. The radio frequency unit may be configured to receive a radio frequency signal and convert the radio frequency signal into a baseband signal for processing by the baseband unit. The payment information is included in the radio frequency signal and, therefore, is acquired by the NFC unit 201 or the mobile communication unit 202.

The mobile payment apparatus 20 in FIG. 2 further includes a memory 203 that may be configured to store mobile payment software, a SE 204, and at least one CPU 205. The at least one CPU 205 is configured to execute general operating system software such as a general operating system like an ANDROID operating system, a WINDOWS operating system, or an iOS operating system. These operating systems may be used to support non-mobile-payment normal application software. A larger quantity of CPUs 205 indicates a stronger capability to process data. The general operating system software is a general software platform on which various application software is executed. The CPU 205 may be implemented based on an ARM architecture, an INTEL X86 architecture, or a million instructions per second (MIPS) architecture, which is not limited in this embodiment. The at least one CPU 205 controls the NFC unit 201, the mobile communication unit 202, the memory 203, and the SE 204 under action of the general operating system software. A control process may include controlling of turning-on, turning-off, entry into or exit from a low power state. Therefore, the CPU 205 executing a general operating system may implement uniform control on other parts in the mobile payment apparatus 20 so that these parts are normally powered on or powered off or enter or exit a low power state, for example, enter or exit a sleep state. Power consumption of any component, in a low power state, in the communication unit, the memory, or the SE is lower than power consumption when the component is not in the low power state. In addition, the control process of any component may further include another control operation, for example, controlling a working state. Controlling a working state may be adjusting a working voltage, a clock rate, a processing speed, or the like when the component works, which is not limited in this embodiment. For one control process, reference may be made to a control operation by a general CPU on another component.

Figure 6:
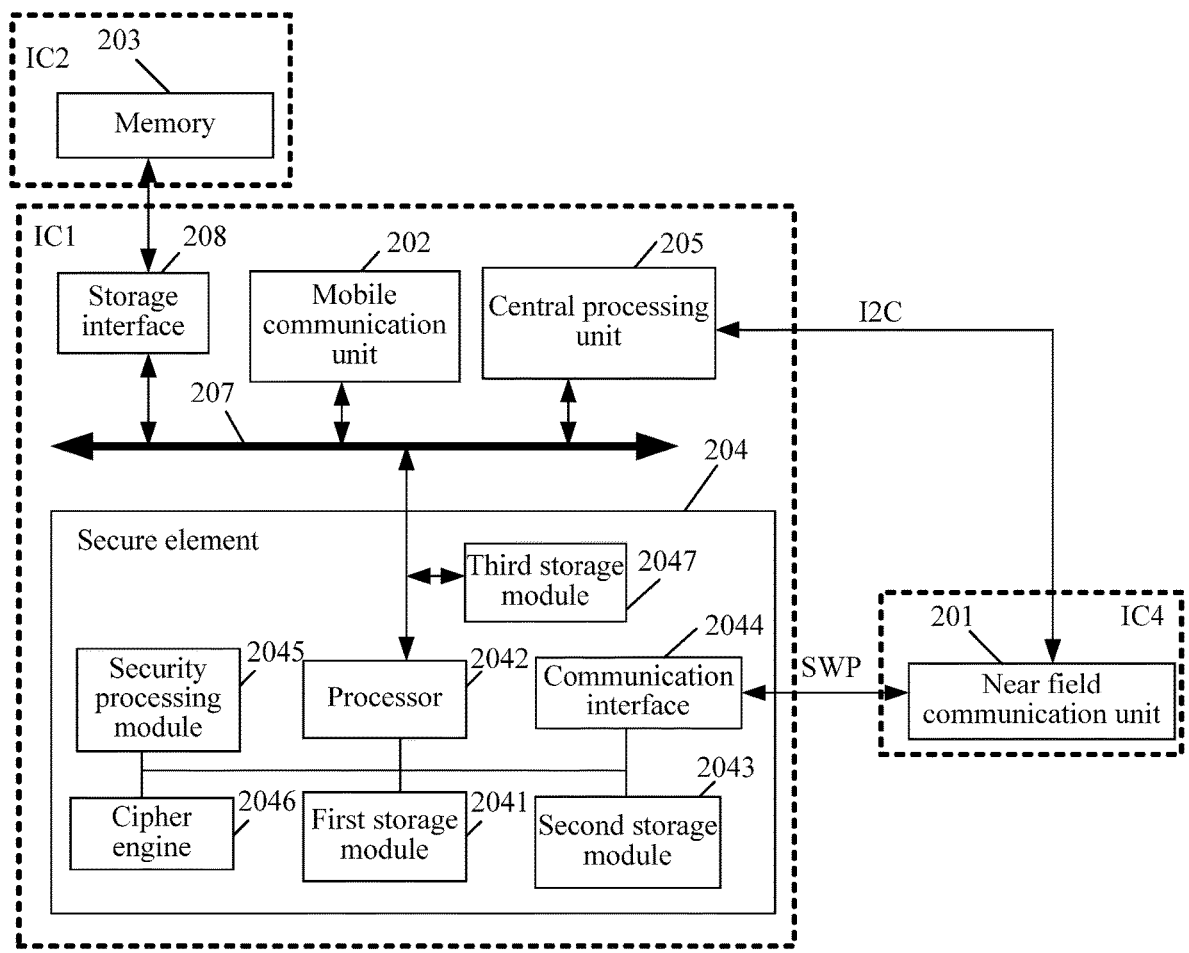
FIG. 6 is a simplified schematic diagram of a structure of a system used for mobile payment in a mobile payment apparatus according to an embodiment of the present disclosure.
Figure 7:
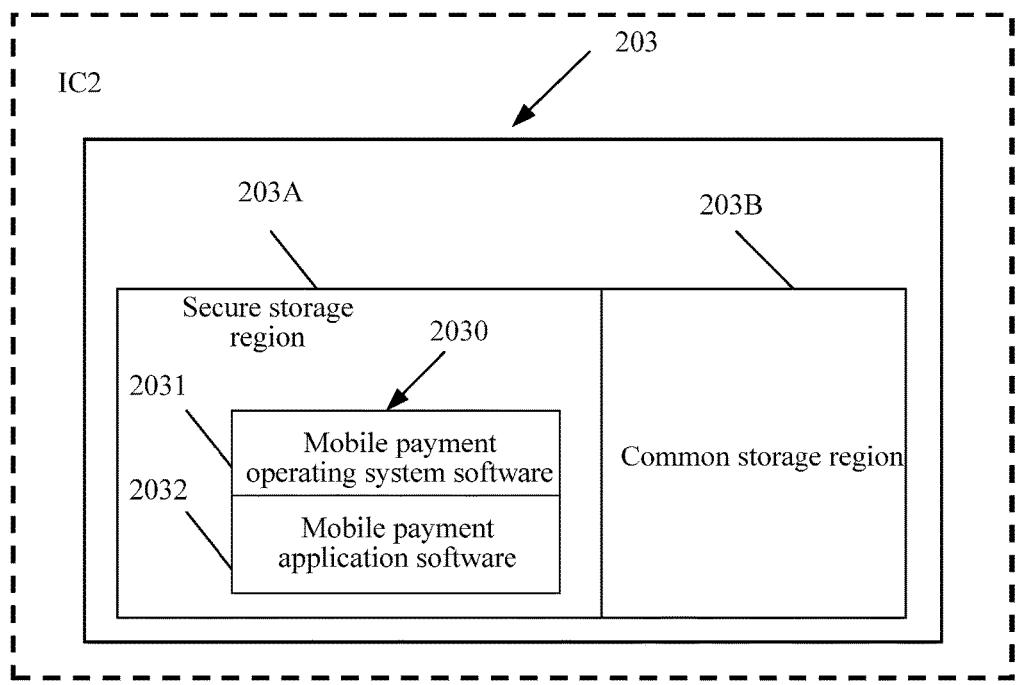
FIG. 7 is a simplified schematic structural diagram of a memory used for mobile payment according to an embodiment of the present disclosure.

Referring to a system structure in FIG. 6, the system structure further describes some components in detail based on FIG. 2. The SE 204 may include a first storage module 2041 and a processor 2042. For exemplary content included in memory 203 in FIG. 6, reference may be made to FIG. 7, and mobile payment software 2030 may be stored in the memory 203. With reference to FIG. 6 and FIG. 7, the processor 2042 is configured to load the mobile payment software 2030 from the memory 203 to the first storage module 2041, execute the mobile payment software 2030, and exchange payment information with at least one of the NFC unit 201 or the mobile communication unit 202 under action of the mobile payment software 2030. The first storage module 2041 provides memory space for executing the mobile payment software 2030 for the processor 2042. The first storage module 2041 may be a random access memory (RAM). The memory 203 may be a read-only memory (ROM). As shown in FIG. 7, the mobile payment software 2030 stored in the memory 203 may include mobile payment operating system software 2031, where the mobile payment operating system software 2031 is different from common operating system software and is an operating system platform used to execute mobile payment application software 2032. Therefore, the mobile payment is more reliable.

In an optional implementation manner, the mobile payment operating system software 2031 may be a COS. The COS is also referred to as a COS mirror, and may be equivalent to operating system software in a resident smart card or a financial integrated circuit (IC) card. In this case, the SE 204 equivalently has a function of the resident smart card or the financial card and is configured to provide an external POS machine, a card reader, or a financial server on a cloud side with data required by a mobile payment service such as card reading, where the data is, for example, data related to a bank financial service or data of a personal account of a user, such as a personal account number, a password, and various verification information for verifying a personal account by a bank server. In addition, the COS mirror is also an operation platform that receives and processes external payment information, for example, various payment information sent by a financial server, a card reader, or a POS machine to the SE 204. The COS mirror may be configured to execute various instructions that are from outside, where the instructions are, for example, an operation like an authentication operation, manage space of the first storage module 2041 in the SE 204, return response information to the outside, and the like. The SE 204 may use a COS that may be based on the computer programming language JAVA as a security system. Not only the COS can be preset in the SE 204, but also the mobile payment apparatus 20 can further dynamically download and install various mobile payment application software 2032 such as various financial application software based on the COS. A specific design of the COS is content pertaining to the prior art, and is not in the discussion scope of this application.

In FIG. 7, in addition to the mobile payment operating system software 2031, the mobile payment software 2030 further includes multiple types of mobile payment application software 2032. One type of mobile payment application software 2032 is used for one category of mobile payment functions. For example, each type of mobile payment application software 2032 may be application software related to a bank and is used to implement a software function related to the bank, where the software function includes, for example, an account, a password, and authentication and verification related information that are related to the bank, and a function related to a special service of the bank. A mobile payment application is not limited to only a bank service and also includes, but is not limited to, a debit card service, a credit card service, or another type of mobile payment, for example, a payment service of a social security card, a transportation card, or an internal IC card of a unit, which is not limited in this embodiment.

In FIG. 2 or FIG. 6, the SE 204 and the at least one CPU 205 are located in a first semiconductor chip IC1 in the mobile payment apparatus 20, and the IC1 is also referred to as a central chip of the mobile payment apparatus 20. The SE 204 and the at least one CPU 205 are integrated using the same semiconductor central chip IC1, which reduces costs and an area for implementation of mobile payment hardware. Different from the prior art in which a hardware function unit related to secure payment and the central chip are respectively made into two independent chips, the central chip IC1 having a higher integration capability may be capable of being arranged on a main board of the mobile payment apparatus 20 more simply. Optionally, as shown in FIG. 2 or FIG. 6, the NFC unit 201 may be located in a fourth semiconductor chip IC4 in the mobile payment apparatus 20. It may be understood that, in addition to implementing the NFC unit 201 using the fourth semiconductor chip IC4 shown in FIG. 2 or FIG. 6, the NFC unit 201 may also be located in the first semiconductor chip IC1 (not shown in the figure), so as to further implement the integration of the central chip IC1 and reduce implementation costs. Similarly, as shown in FIG. 6, the mobile communication unit 202 may be located in the first semiconductor chip IC1, or as shown in FIG. 2, the mobile communication unit 202 is independently located in a fifth semiconductor chip IC5 in the mobile payment apparatus 20. Whether the NFC unit 201 or the mobile communication unit 202 is integrated into the central chip IC1 depends on a specific design by a person skilled in the art.

In the various embodiments of the present disclosure, a semiconductor chip is also briefly referred to as a chip and may be a set of integrated circuits that are made on an integrated circuit substrate (which is generally a semiconductor material such as silicon) using an integrated circuit technology. An external layer of the semiconductor chip is generally packaged using a semiconductor packaging material. The integrated circuit may include a metal-oxide-semiconductor (MOS) transistor, a bipolar transistor, a diode, or the like. The semiconductor chip may independently work or may work under action of necessary driver software, to implement functions, such as communication, computation, or storage.

For distribution of parts in the mobile payment apparatus 20 on different chips, still refer to FIG. 2. When the NFC unit 201 and the mobile communication unit 202 are disposed on another chip than the central chip IC1, the memory 203 may be located in a second semiconductor chip IC2 in the mobile payment apparatus 20. Alternatively, the memory 203 may be integrated into the central chip IC1 (not shown in the figure) together with the NFC unit 201 or the mobile communication unit 202. In this case, the memory 203 and the SE 204 may be considered as a system implementing secure payment. However, generally, similar to the solution in FIG. 2 or FIG. 6, the second semiconductor chip IC2 independent of the central chip IC1 is used more often in the art to implement the memory 203, because the memory 203 generally exists in a form of a flash memory if the memory 203 is integrated into the central chip IC1, but a flash memory generally has very limited memory space, and if large memory space needs to be implemented, a great cost increase and complex implementation will result. If the flash memory 203 is implemented using the independent second semiconductor chip IC2, the implementation cost will be reduced to some extent with a simpler design, and a requirement of a large storage capacity can be better satisfied. Especially, for reasons such as processing technique and area, it may be difficult to integrate a current memory with the central chip IC1. Therefore, only the SE 204 may be integrated with the at least one CPU 205, in which case a memory 203 independent of the central chip may be used, which is more suitable for an existing mobile payment solution.

When a memory similar to the off-chip memory 203 in FIG. 2 or FIG. 6 is used, the memory 203 may be further used for both the mobile payment software 2030 and other software. In this implementation manner, the memory 203 includes a secure storage region 203A and a common storage region 203B that are isolated from each other. For details, refer to FIG. 7. The secure storage region 203A is used to store the mobile payment software 2030, and the common storage region 203B is used to store the general operating system software that is mentioned above. The at least one CPU 205 is configured to read the general operating system software from the common storage region 203B in the memory 203 and execute the general operating system software and the processor 2042 is configured to load the mobile payment software 2030 from the secure storage region 203A to the first storage module 2041. The isolation indicates that the general operating system software and the mobile payment software 2030 are not mixed, but coexist in the same memory 203, and are accessed by their respective execution entities, which saves memory resources on the premise of ensuring security. In this case, the memory 203 may be an embedded multimedia card (eMMC), and the secure storage region 203A may be a replay protected memory block (RPMB) of the eMMC memory 203. The memory 203 may also be another storage device, which is not limited in this embodiment.

In another optional implementation manner, the memory 203 may be dedicated to storage of the mobile payment software 2030. For example, in this case, the memory 203 does not store any other software that is not related to mobile payment, for example, the general operating system software. In this case, the mobile payment apparatus 20 further includes a common storage unit 206. As shown in FIG. 2, the common storage unit 206 is located in a third semiconductor chip IC3 in the mobile payment apparatus 20 and the common storage unit 206 is configured to store the general operating system software. The at least one CPU 205 is configured to read the general operating system software from the common storage unit 206 and execute the general operating system software. In this case, the dedicated memory 203 is physically isolated from the common storage unit 206 so that operational security is further improved. The common storage unit 206 may be the eMMC described above. The dedicated memory 203 may be a flash memory independent of the central chip IC1. However, specific storage types of the common storage unit 206 and the dedicated memory 203 are not limited in this embodiment.

Referring to FIG. 6, in an optional implementation manner, the SE 204 further includes a second storage module 2043 configured to store a startup program for initiating the processor 2042, for example, boot code for startup. When the SE 204 is powered on, the processor is configured to read the startup program from the second storage module 2043, load the mobile payment operating system software 2031, for example, a COS mirror, from the memory 203 to the first storage module 2041 under action of the startup program, and execute the mobile payment operating system software 2031. Because a startup program for initiating the SE 204 is located in the second storage module 2043 in the SE 204, the second storage module 2043 is dedicated to startup of the SE 204 and is not freely accessed by any software executing program or any hardware except for the SE 204, which ensures security.

In an optional implementation manner, when the processor 2042 exchanges the payment information with the NFC unit 201 or the mobile communication unit 202, the processor 2042 may be triggered by the payment information to load one or more types of mobile payment application software 2032 of the at least one type of mobile payment application software 2032 from the memory 203 to the first storage module 2041 and execute the one or more types of mobile payment application software 2032. Because the loading and executing of the mobile payment application software 2032 is triggered by the exchanged payment information, when there is no payment service, related mobile payment application software 2032 may be not started, which can save memory space of the first storage module 2041. For example, the mobile payment application software 2032 is loaded in a dynamic loading manner, for example, only selected application software is loaded from the external memory 203 to the corresponding first storage module 2041, for example, a RAM. Another type of application software that does not need to be used is not loaded to the RAM, ensuring that occupied space in the RAM is used to accommodate only the COS mirror and program files of one to two types of application software, which does not make the RAM over-occupied.

The solution in which the processor 2042 exchanges the payment information with the communication peer end (such as a payment terminal or a RAN) using the communication unit (such as the NFC unit 201 or the mobile communication unit 202) is content pertaining to a mobile payment protocol. There are already multiple solutions for this in the prior art, and a procedure of the solution may be similar to a credit card reading process. Each different service provider such as a bank or a public transportation authority may have its own mobile payment handshake communication protocol, which is used to implement a payment handshake, for example, transfer of personal confidential information and sending of security data, between the processor 2042 in the SE 204 and the communication peer end via the communication unit.

Figure 3:
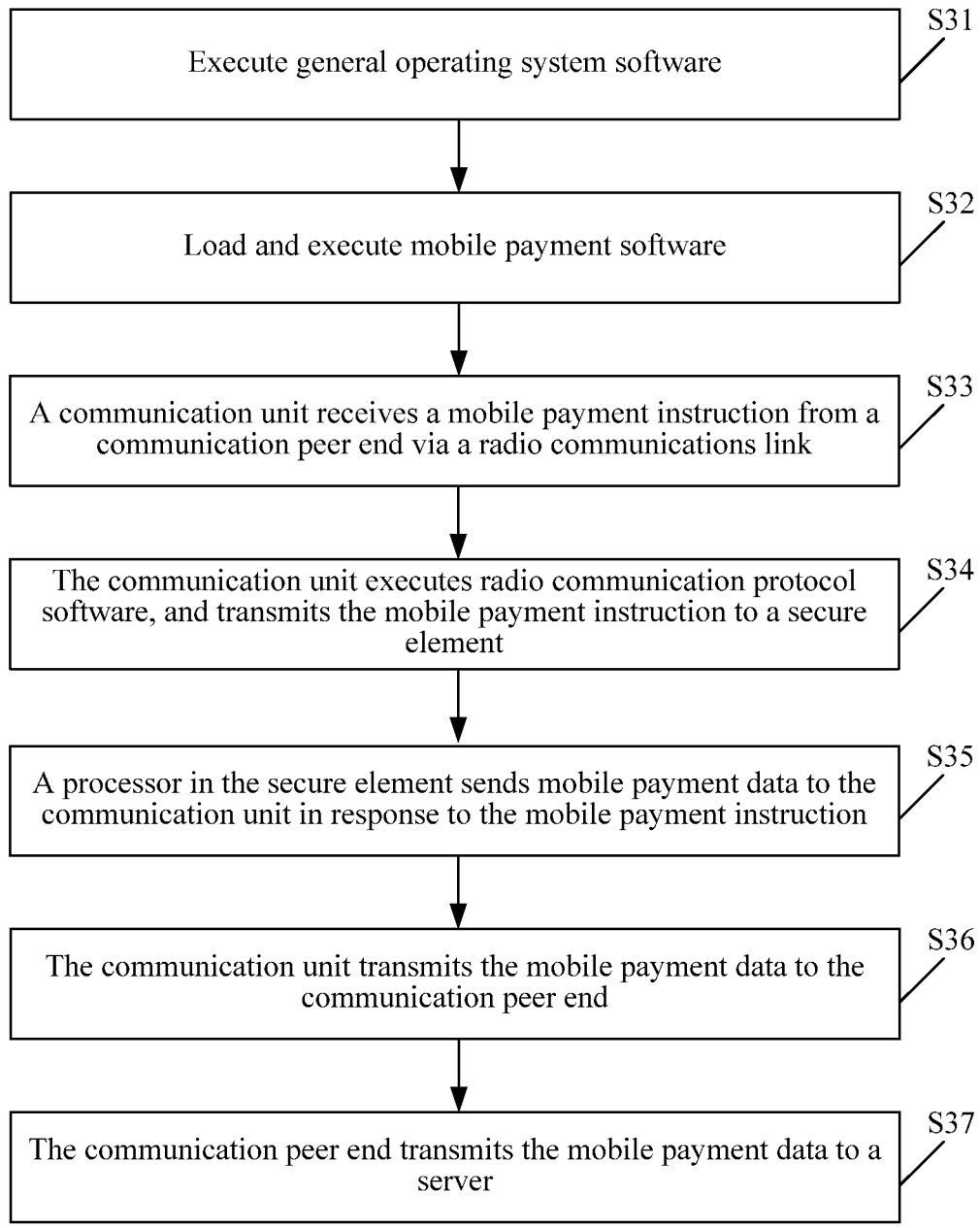
FIG. 3 is a simplified schematic diagram of a mobile payment procedure according to an embodiment of the present disclosure.

For ease of description, this embodiment provides a flowchart of mobile payment shown in FIG. 3. In a related procedure, various information that is related to mobile payment and that is transferred between the mobile payment apparatus 20 and a payment terminal using a radio link (including a cellular radio communication link or a short distance radio communication link) may all be considered as the payment information. Simplified steps of the payment procedure may include the following.

S31: The CPU 205 executes the general operating system software, and controls the communication unit and the SE 204 under action of the general operating system software, where the control may be controlling of turning-on, turning-off, entry into or exit from a low power state.

S32: The SE 204 loads the mobile payment software 2030 from the memory 203 and executes the mobile payment software 2030.

S33: The communication unit receives a mobile payment instruction from the communication peer end via a radio communication link, where the instruction may be a request message for requesting the mobile payment apparatus 20 to perform mobile payment, and the message may be included in air interface signaling. For specific implementation and a signaling structure of the air interface signaling, reference may be made to content of an existing radio communication protocol. In addition to being used to initiate a payment service, the mobile payment instruction may further include a verification and authentication request. For specific content of the mobile payment instruction, reference may be made to the prior art in the field of mobile payment, and the specific content of the mobile payment instruction is not discussed in this application.

S34: The communication unit parses the air interface signaling by executing radio communication protocol software to obtain the mobile payment instruction and transmits the mobile payment instruction to the processor 2042 in the SE 204.

S35: When being driven by the mobile payment software 2030, the processor 2042 sends mobile payment data to the communication unit in response to the mobile payment instruction. The mobile payment data may include data for proving an identity of a user, and the data is, for example, a bank card number, an account number, personal confidential information, or cipher texts needed in various bank transactions, and is similar to credit card information for credit card payment and used for reading by the communication peer end.

S36: The communication unit executes the radio communication protocol to encapsulate the mobile payment data into air interface signaling, and transmits the air interface signaling to the communication peer end.

S37: The communication peer end transmits the mobile payment data to a server and the server processes the mobile payment data to complete a payment service.

Optionally, when offline payment is performed, the communication peer end is a payment terminal, for example, a POS machine, and the payment terminal transmits the mobile payment data to a server on a cloud side through the Internet. Alternatively, when online payment is performed, the mobile communication unit 202 is used as a communication unit to transfer the mobile payment data to the server through the RAN. For a specific operation of the server, reference may be made to an existing payment solution, for example, an existing online bank payment service. The specific operation of the server is not described in this disclosure. After completing a transaction, the server may return transaction success information to a POS machine with which offline payment is performed and the transaction success information is displayed on the POS machine. When online payment is performed, the server directly returns transaction success information to the mobile communication unit 202 of the mobile payment apparatus 20 so that the information can be displayed on the mobile payment apparatus 20. Optionally, when the transaction fails, the server may return payment failure information in place of the transaction success information, which is not limited in this embodiment. The payment information includes a bidirectional communication process and is used to implement mobile payment handshake communication between a cloud server on a network side and the mobile payment apparatus 20. A handshake process of bidirectional communication of the payment information varies with different service providers and different mobile payment application software 2032 executed by the processor 2042 and generally depends on different service providers.

As shown in FIG. 6, for offline payment, when the processor 2042 exchanges the payment information with the NFC unit 201, the processor 2042 may exchange the payment information with the NFC unit 201 (located in the IC4) outside the central chip IC1 using a communication interface 2044 included in the SE 204. The communication interface 2044 may comply with a Single Wire Protocol (SWP). The communication interface 2044 may also implement transmission of data or information using another interface protocol. If the NFC unit 201 is also integrated into the central chip IC1, the processor 2042 may exchange information with the NFC unit 201 using an on-chip connection wire, for example, an on-chip bus 207 in FIG. 6. Because the communication interface 2044 is a standard SWP interface, the communication interface 2044 may be implemented using the standard SWP protocol. How the NFC unit 201 transmits, based on the SWP protocol, data that is acquired from the POS machine to the SE 204 is an existing mature solution and is not discussed in this application. In addition, the NFC unit 201 and the at least one CPU 205 may be connected using an inter-integrated circuit (I2C) interface to transfer other data. Another interface may also implement a similar purpose and should not be excluded from the implementation solution. The NFC unit 201 may internally store a routing table, and the NFC unit 201 may identify to which type the communication initiated by the communication peer end belongs. If the initiated service is a payment service, the NFC unit 201 forwards related data of the related payment service to the SE 204 using the SWP interface by querying the routing table so that the processor 2042 in the SE 204 performs processing. If the initiated service is a non-payment service, the NFC unit 201 forwards data of the related non-payment service to the at least one CPU 205 using the I2C interface by querying the routing table. For example, if the initiated service is for counting working hours by contacting a staff card with a card reader in an enterprise, the NFC unit 201 may send data to the at least one CPU 205 using the I2C interface and the data is used to perform card reading analog application in a general operating system, for example, an ANDROID environment.

For online payment, assuming that the implementation manner in which the mobile communication unit 202 is integrated into the central chip IC1 is used, referring to FIG. 6, the processor 2042 may also exchange the payment information with the mobile communication unit 202 using an on-chip bus 207. The on-chip bus 207 may be further connected to the CPU 205 and a storage interface 208. The storage interface 208 is used by the central chip IC1 to exchange data with the memory 203 in the second chip IC2.

In an optional implementation manner, the mobile payment data provided by the processor 2042 to the communication peer end may be a result of security processing, and the security processing may include at least one of data encryption or data integrity protection. The processor 2042 may further generate the data resulting from security processing when being driven by the mobile payment software 2030, for example, the processor may be driven by software to perform security processing to ensure that the processed mobile payment data is transmitted to the server. The server may correspondingly perform decryption and computing integrity protection on the mobile payment data, to verify whether the mobile payment data is tampered with. If the mobile payment data is tampered with, the server may return the payment failure information mentioned above so as to ensure security of the mobile payment procedure. Alternatively, the processor 2042 may generate only original data, where the original data is mobile payment data that has not gone through security processing. An independent security processing module 2045 in the SE 204 performs security processing on the original data to generate the data resulting from security processing. The security processing module 2045 may be independent of the processor 2042 in hardware form and may be a hardware accelerator including a circuit structure, where the hardware accelerator is configured to accelerate the security processing so that implementation of the processing is further optimized.

When the data exchanged with the communication peer end needs to go through security processing, the processor 2042 reads the mobile payment software 2030 from the memory 203 and security protection may be provided for reading and writing of the mobile payment software 2030 to implement better security. For example, the SE 204 further includes a cipher engine 2046 configured to perform security verification on the mobile payment software 2030 after the processor 2042 loads the mobile payment software 2030 from the memory 203 to the first storage module 2041 and instruct the processor 2042 to execute the mobile payment software 2030 after the security verification succeeds, where the security verification includes at least one of security decryption or first hash check. Optionally, the cipher engine may be a hardware accelerator including a circuit structure. Because the cipher engine 2046 in a form of hardware is independent of the processor 2042 and is dedicated to implementation of a security verification function, it may be ensured that the mobile payment software 2030 is executed only after the verification succeeds which prevents the mobile payment operating system software 2031 or the mobile payment application software 2032 in the mobile payment software 2030 from being tampered with and helps improve processing performance when security verification is performed.

In addition to reading the mobile payment software 2030 to verify the mobile payment software 2030, the cipher engine 2046 may be further configured to perform at least one type of processing in security encryption or first hash operation processing on update data. The processor 2042 is further configured to write the processed update data to the memory 203, to update the mobile payment software 2030. For example, the data update may be update of a COS mirror or update of any one type of mobile payment application software 2032. Content of the update data may include a file for updating the COS mirror or the mobile payment application software 2032 and may include an update of information used to perform data encryption or data integrity protection on the mobile payment data, for example, update of a key, or may include a record file of mobile payment such as modification of personal information and a transaction log. The content of the update data is not limited in this embodiment.

Alternatively, the functions of the cipher engine 2046 may also be replaced with the processor 2042. In this case, an independent hardware cipher engine 2046 does not need to perform security processing on the mobile payment software 2030 that is read from the memory 203 or that is written to the memory 203 and the processor 2042 integrates the security functions. Further, when writing the processed update data to the memory, the processor 2042 may further perform second hash operation processing on the processed update data using a key Krpmb, to obtain data to be stored. The second hash operation processing may be similar to a process of the first hash operation processing mentioned above and the keys used when the two types of hash processing are performed are generally different. For example, the update data may be encrypted in the second hash operation processing using the key Krpmb to obtain a digest value, the digest value and the update data are combined to generate the data to be stored, and the digest value may also be a message authentication code (MAC) signature. The memory 203 is further configured to perform second hash check on the data to be stored, where the second hash check is a process corresponding to the second hash operation processing and is used to check whether the data to be stored that has gone through the second hash operation processing is tampered with. For details, reference may be made to the prior art for checking the MAC signature. After the second hash check succeeds, the memory 203 obtains the processed update data and updates the mobile payment software 2030 using the processed update data.

An example in which the memory 203 is an eMMC is used. Referring to FIG. 7, the secure storage region 203A of the memory 203 is used to store the mobile payment software 2030. When the processor 2042 performs a write operation, an erase operation, or the like on the secure storage region 203A, a signature of a verification command is needed, where the verification command is a key Krpmb. The eMMC memory 203 checks, according to a preset key Krpmb, whether a write command data packet sent by the processor 2042 is correct, and each write command data packet may include some data packets of all update data. The hash check processing algorithm performed using the key Krpmb may be a hash-based message authentication code secure hash algorithm (HMAC SHA) 256 algorithm. In an optional implementation manner, when the eMMC memory 203 is produced, a unique key Krpmb of each eMMC memory 203 is programmed into the eMMC memory 203. The key Krpmb may also be programmed into the SE 204 or recorded in the SE 204. The key Krpmb may be programmed into the processor 2042 of the SE 204 using an electronic fuse (eFuse) technology or may be programmed into another hardware circuit instead of the processor 2042 and the SE 204 manages and uses the key Krpmb.

Figure 8:
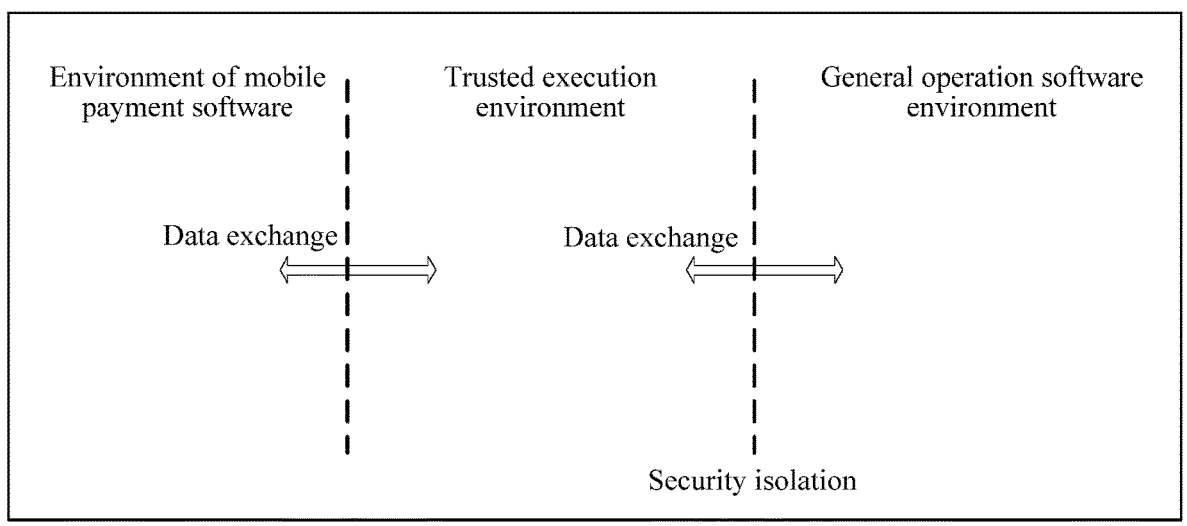
FIG. 8 is a simplified schematic diagram of an architecture of a software system used for mobile payment according to an embodiment of the present disclosure.

In addition to management and use of the key Krpmb by the SE 204, in another optional implementation manner, management and use of the key Krpmb in a trust zone (TZ) of the CPU 205 is a more common implementation manner. The TZ is a trusted execution environment (TEE). An environment formed by executing a type of software, for example, a software system, can exchange data with another external software or hardware system. As shown in FIG. 8, the TEE executed by the CPU 205 is securely isolated from the general operating system software (for example, an ANDROID system environment) that is also executed by the CPU 205. The TEE and the general operating system software are respectively two independent software systems. Although the TEE and the general operating system software are executed by the same CPU 205, security isolation between the TEE and the general operating system software may be desirable, and the general operating system software and a executing program of general application software that is based on the operating system cannot access the TEE freely. The TEE may transmit data with an environment, for example, the SE 204, formed by executing the mobile payment software 2030 by the processor 2042. Therefore, the general operating system software is securely isolated from both the TEE and the SE 204 so that the general operating system software or the executing program of the common application software that is based on the software does not freely access the TEE and the SE 204. Even if the access needs to be performed using a security interface of specific software or hardware, there is less security isolation between the TEE and the SE 204, and operations are relatively convenient. The common application software may include various software related to non-secure payment, for example, instant messaging software, games, office software, ebook software, or audio and video streaming players.

In an optional implementation manner, management of the key Krpmb may be implemented in a TEE. The key Krpmb may be programmed into a related hardware circuit of the CPU 205. In this way, various non-security software of the general operating system software (for example, an ANDROID system) of the CPU 205 does not know the Krpmb. Therefore, a write operation cannot be performed on the secure storage region 203A of the eMMC memory 203. For another common storage region 203B in the eMMC memory 203, the general operating system software of the CPU 205 and executing programs of various common application software can all be accessed. Because the general operating system software is securely isolated from the SE 204, the general operating system software cannot freely access the SE, which can improve security of mobile payment.

Optionally, the TEE may provide a visual UI of bank payment or another financial service so that a user inputs an instruction using the UI and the instruction is transmitted to the SE 204 using the TEE which implements that the user completes exchange of information with the SE 204 using the UI. The UI is a trusted UI and different from a common UI provided by the general operating system software. The UI may enable a mobile payment password input by the user to be transmitted to the SE 204 using a relatively secure TEE and then the information including the mobile payment password undergoes data encryption and is transmitted to a server on a network side using the NFC unit 201 or the mobile communication unit 202.

Figure 4:
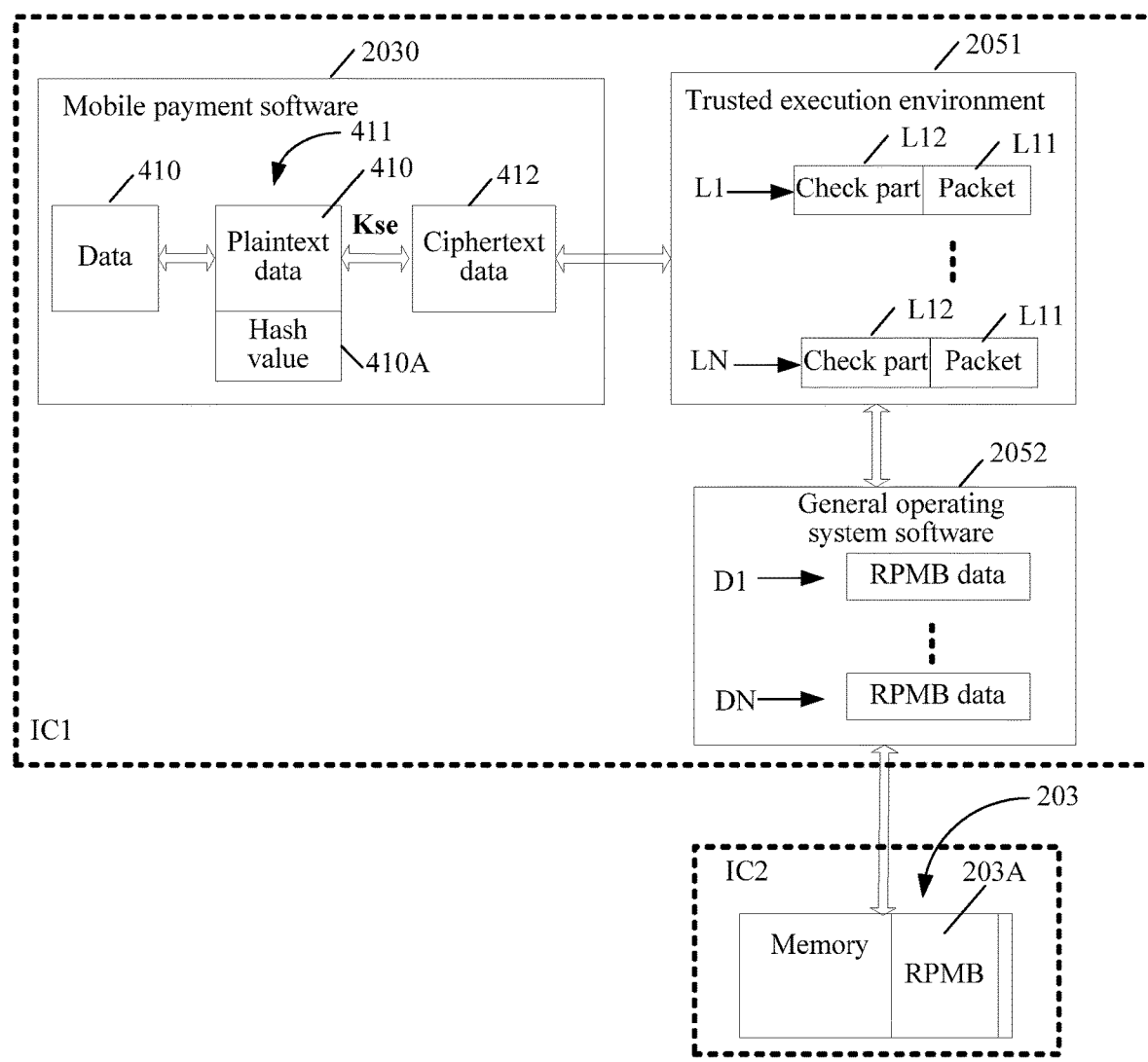
FIG. 4 is a simplified schematic diagram of performing a secure access operation on a secure storage region of a memory by mobile payment software according to an embodiment of the present disclosure.

In one implementation manner, an example in which the memory 203 is in type an eMMC is used. FIG. 4 is a schematic diagram of a software architecture of performing an access operation on the secure storage region 203A of the eMMC memory 203 according to an embodiment of the present disclosure. The access may include reading data from the secure storage region 203A or writing data to the secure storage region 203A (updating or upgrading security data), where a unit of the reading or writing may be a fixed length unit. The software architecture includes the mobile payment software 2030 and is executed by the SE 204. The mobile payment software 2030 provides a similar function related to a card reading operation of a resident smart card or an IC card and may include the mobile payment operating system software 2031 and the mobile payment application software 2032 that are mentioned above.

In FIG. 4, for a write process of the eMMC memory 203, in a secure environment provided by executing the mobile payment software 2030 by the processor 2042, data 410 is data to be updated or upgraded, hash calculation processing is performed on the data 410 to obtain processed data 411, and the data 411 includes the data 410 that is used as plaintext data and a hash value 410A (which may also be referred to as a digest of the data 410) of the plaintext data 410. Then, security encryption is performed on the data 411 in the secure environment. A key Kse may be used to encrypt the data 411 to obtain ciphertext data 412. The key Kse may be one or more groups of keys and an encryption algorithm for security encryption may be any symmetric encryption algorithm or asymmetrical encryption algorithm. For example, an available encryption algorithm may be an advanced encryption algorithm (AES), which is not limited in this embodiment. Then, the SE 204 may transmit the ciphertext data 412 and a write address to the CPU 205 using a system bus 207 shown in FIG. 6, for example, the ciphertext data 412 and the write address of the ciphertext data 412 are transferred from an environment of the mobile payment software 2030 to the TEE 2051 generated by the CPU 205. Performing, by the CPU 205, second hash operation processing on the ciphertext data 412 and the write address of the ciphertext data 412 in the generated TEE 2051 may be encrypting the ciphertext data 412 or a part of the ciphertext data 412 using the key Krpmb, to obtain a digest value resulting from hash processing, for example, a MAC signature. The encryption algorithm may be a hash algorithm, for example, an HMAC SHA 256 algorithm, described in the foregoing embodiment. The second hash operation processing may also be another processing algorithm meeting a data security requirement of the secure storage region 203A of the eMMC memory 203. In the TEE 2051, the ciphertext data 412 and the write address, as data, may be divided into multiple parts and all parts are processed in parallel. As shown in FIG. 4, the TEE 2051 includes multiple queues L1, . . . , and LN, where for each queue, for example, a queue L1 includes some packets L11 and a check part L12, and the check part L12 is a digest value resulting from second hash operation processing on the packet L11 using the key Krpmb. Then, each queue is transferred from the TEE 2051 to the general operating system software 2052, and generally, is transferred to a kernel of the general operating system software 2052. The transfer process is generally transparent transmission, for example, the general operating system software 2052 does not modify data content. In an environment of the general operating system software 2052, each of queue L1, . . . , and LN is converted into RPMB data D that can be read by the eMMC memory 203, and D may also be divided into multiple segments or queues, for example, D1, . . . , and DN, and is transmitted to the eMMC memory 203 using the storage interface 208 shown in FIG. 2 or FIG. 6. In the environment of the general operating system software 2052, eMMC protocol command processing is performed on the queue L1 to obtain the data D1, . . . , and DN complying with a standard of the storage interface 208, but the original data content is not processed or reconstructed. As described above, the eMMC memory 203 has the key Krpmb, obtains the queue L1 based on the data D1, and performs MAC signature check on the check part L12 in the queue L1 using the key Krpmb. The key Krpmb is used to encrypt the packet L11 in the queue L1 to obtain a digest value, and the digest value is compared with the check part L12, to obtain a check result. If the check succeeds, the ciphertext data 412 or a part thereof and a corresponding write address are obtained based on the multiple packets L11, and the ciphertext data 412 or the part thereof is written to the secure storage region 203A, for example, an RPMB, of the eMMC memory 203 according to the write address.

Referring to FIG. 4, a read process of the eMMC memory 203 is a procedure reverse to the previous write process, and is not described in detail in this embodiment. The data queue that is sent by the eMMC memory 203 to the general operating system software 2052 and that is transferred by the general operating system software 2052 to the TEE 2051 is encrypted using the key Krpmb, and the data queue includes the packet L11 of data content and the check part L12 generated by means of encryption. In the TEE 2051, the CPU 205 encrypts using the key Krpmb, the packet L11 in the temporarily stored queue L1 to obtain the digest value and the digest value is compared with the check part L12 to check whether the data is tampered with. The SE 204 may be the cipher engine 2046 or the processor 2042 described above, and in the environment provided by the mobile payment software 2030, the ciphertext data 412 is obtained using the system bus 207 or another interface and security decryption is performed using the key Kse to obtain the data 410 and the hash value 410A of the data 410. The SE 204 further performs hash check on the hash value 410A and after the check succeeds, confirms that related data is not tampered with so that reading is performed successfully. If either of the hash check and security decryption does not succeed, it may be concluded that the related data is tampered with, and data fetched this time is untrustworthy. Therefore, the processor 2042 in the SE 204 may determine to discard the data. Optionally, when the data is untrustworthy, the processor 2042 may report an error or give an alarm to the CPU 205, which is not limited in this embodiment. For the operation of the eMMC memory 203, the read process and the write process of both the mobile payment operating system software 2031 such as a COS mirror and the mobile payment application software 2032 may be similar to those in FIG. 4.

In the embodiment corresponding to FIG. 4, an example in which data is written to the memory 203 is used. When the processor 2042 needs to erase data in the memory 203, the processor 2042 may also generate an erase instruction, where the instruction carries an address of data needing to be erased. The instruction is transmitted by the processor 2042 to the CPU 205, for example, transmitted by the mobile payment software 2030 to the TEE 2051. Encryption (hash processing) may be performed on the instruction by the CPU 205 in the TEE 2051 using the key Krpmb to obtain a digest value, and the digest value and the instruction are both transferred by the general operating system software 2052 to the memory 203. In this case, the memory 203 uses a check method similar to that above, for example, encryption (hash processing) is performed on the instruction using the same Krpmb, and an obtained result is compared with the digest value, to determine whether check performed on the instruction succeeds. When the check succeeds, the memory 203 may erase corresponding data according to an address in the instruction. Alternatively, in the erase operation, the key Krpmb encryption (hash processing) may also be processed by the processor 2042 in the SE 204 and not be performed by the CPU 205 in the TEE 2051. Because hash processing needs to be performed in the process of the erase operation, and other non-security software based on the general operating system software 2052 cannot know the key Krpmb, data in the memory 203 cannot be freely erased which improves security. Erased data may be some data of the mobile payment software 2030 stored in the memory 203. For example, the memory 203 may erase some data of the mobile payment operating system software or all or some data of the mobile payment application software 2032 in response to the instruction according to the address in the instruction.

It should be noted that the foregoing solution may be used in a case in which the eMMC memory 203 is used for both the mobile payment software 2030 and the general operating system software 2052. It may be seen that it may be difficult for the non-security software to access the secure storage region 203A of the eMMC memory 203 unless the keys Krpmb and Kse are both decrypted, so that privacy and integrity of data can be better ensured. The key Kse may be a means for generating a ciphertext in the SE 204 and preventing intrusion. Security of exchanging data between the SE 204, the CPU 205, and the storage interface 208 using an on-chip bus 207 may be higher than another interface transmission technology, for example, SPI transmission so that security of exchanging data between the SE 204 and the eMMC memory 203 is improved. Therefore, compared with a solution in which data is exchanged between a CPU on a central chip and a SE outside the central chip using an SPI, in this embodiment of the present disclosure, the SE 204 can be integrated into the central chip IC1 and data transfer is implemented between the SE 204 and the TEE 2051 of the CPU 205 using the bus 207, so that security is better.

Further, as shown in FIG. 6, the SE 204 may include a third storage module 2047. When data is sent from the mobile payment software environment 2030 to the TEE 2051 using the processing procedure in FIG. 4, the processor 2042 may first write the data to the third storage module 2047 and send an interrupt request to the CPU 205 on the bus 207 to request the CPU 205 to read data in the third storage module 2047. The interrupt request may include an address of the read data in the third storage module 2047. In this way, the CPU 205 may read corresponding data from the third storage module 2047 in response to the interrupt request. When sending data to the SE 204, the CPU 205 may also write data to the third storage module 2047 and request, by sending the interrupt request, the processor 2042 in the SE 204 or another component to read the data. The interrupt request in this embodiment is an indication message used to request reading of data. The third storage module 2047 may be a RAM, for example, an inter-process communication (IPC) RAM. Alternatively, the third storage module 2047 may also be another type of memory, for example, a cache. Compared with a manner for performing communication using an off-chip SPI using the third storage module 2047, communication and data exchange between the SE 204 and the CPU 205 are both performed using the memory 2047 in the central chip IC1 and the bus 207, and security is improved.

Figure 5:
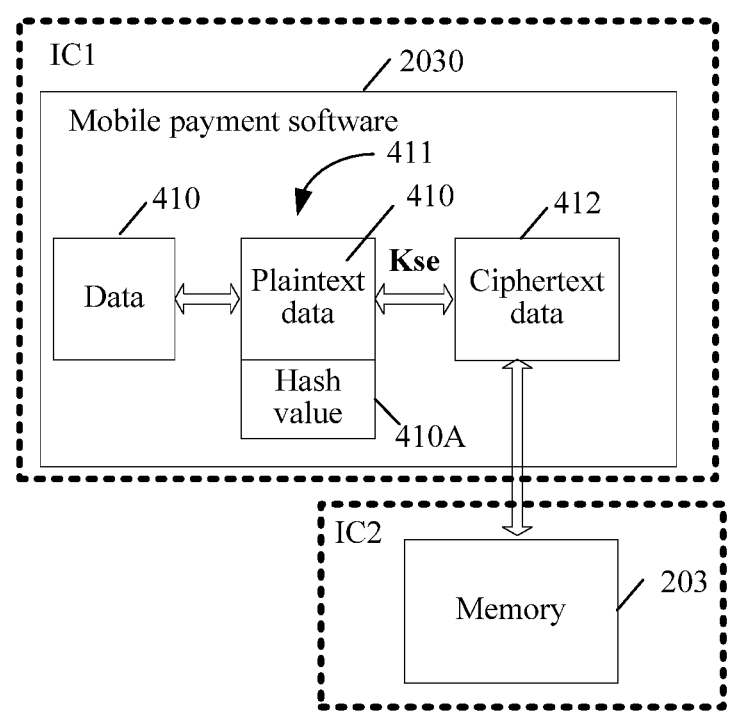
FIG. 5 is another simplified schematic diagram of performing a secure access operation on a secure storage region of a memory by mobile payment software according to an embodiment of the present disclosure.

In another optional implementation manner, a memory storing the mobile payment software 2030 and a memory storing the general operating system software 2052 may be physically isolated. In this case, a basic procedure of writing or reading data is simplified. As shown in FIG. 5, in this case, the memory 203 is located in a second semiconductor chip IC2, which may be a nor flash memory. In a secure environment provided by the mobile payment software 2030, data 410 is data to be updated or upgraded, hash calculation processing is performed on the data 410 to obtain processed data 411, and the data 411 includes the data 410 that is used as plaintext data and a hash value 410A of the data 410. Then, security encryption is performed on the data 411 in the secure environment. A key Kse may be used to encrypt the data 411 to obtain ciphertext data 412. Then, the ciphertext data 412 is directly written to the memory 203. The data read process is inverse to the data write process and is not described in this embodiment. In this implementation solution, the memory 203 is a storage apparatus dedicated to mobile payment. In this case, the SE 204 may directly write various data to the memory 203 or read various data from the memory 203 without forwarding of the trusted execution environment 2051, where the data includes a COS mirror or application software data. When an erase operation is performed, the processor 2042 in the SE 204 may send an erase instruction to the memory 203, where the instruction carries an address of data needing to be erased. After receiving the instruction, the memory 203 may directly erase the data at the related address so as to improve security.

According to the technical solutions, the embodiments of the present disclosure can implement secure mobile payment, and reduce costs and design difficulty of mobile payment. It should be noted that mobile payment is an extensive definition, and not only includes commercial and financial mobile payment services, but also includes other types of payment services such as public transportation, an identity card, and a social security card. For example, by means of mobile payment, a mobile terminal may be connected to a communication peer end to exchange payment information with a server and to implement a data transaction, data redemption, or data settlement associated with one or more accounts in the mobile terminal. In addition to currency, another unit of a data transaction, redemption, or data settlement may be applied as well, for example, virtual currency, various types of bonus points or a line of credit, that can be used to implement payment, redemption, or transaction settlement, which is not limited in this embodiment. The account includes, but is not limited to, a personal account, a group account, or an organization account. Compared with a payment behavior implemented on only a fixed terminal, mobile payment is implemented more flexibly, and an entity for implementing mobile payment is a mobile terminal, which can better meet a requirement for performing payment at any time and in any place.

It should be noted that, in the embodiments of the present disclosure, there may be multiple CPUs 205. That the multiple CPUs 205 exchange data with another component, for example, the SE 204, in the mobile payment apparatus 20 may be that any one or more of the multiple CPUs 205 exchange data with the another component. When the mobile payment apparatus 20 is in a working state, all or some of the multiple CPUs 205 may be started and implement the TEE 2051, the general operating system software 2052, and other application software by means of division of work and coordination with each other.

In addition, the mobile payment apparatus 20 may further include a graphics processing unit (GPU), an audio processing unit, a power management unit (PMU), or a global positioning system (GPS). In addition, the mobile terminal 21 may further include, in addition to the mobile payment apparatus 20 mainly including various circuits, a touch screen used to perform input, a display, and another necessary sensor such as a gravity accelerometer, a gyroscope, or an optical sensor.

The foregoing are merely exemplary embodiments of the present disclosure. A person skilled in the art may make various modifications and variations to the present disclosure without departing from the spirit and scope of the present disclosure. For example, specific shapes or structures of components in the accompanying drawings in the embodiments of the present disclosure may be adjusted according to an actual application scenario.

What is claimed is:

1. A mobile payment apparatus, comprising:
   a transceiver configured to exchange payment information with a communication peer end using a radio link;
   a memory comprising:
      a secure storage region configured to store mobile payment software; and
      a common storage region configured to store general operating system software, wherein the secure storage region and common storage region are isolated from each other;
   a secure element (SE) comprising:
      a processor; and
      a first storage configured to provide memory space for executing the mobile payment software by the processor;
   at least one central processing unit (CPU) coupled to the transceiver, the memory, and the SE, wherein the SE and the at least one CPU are located in a first semiconductor chip in the mobile payment apparatus, and wherein the memory is located in a second semiconductor chip in the mobile payment apparatus,
   wherein the at least one CPU is configured to read the general operating system software from the common storage region and execute the general operating system software, which causes the CPU to be configured to control at least one of the transceiver, the memory, or the SE,
   wherein the processor is configured to load the mobile payment software from the secure storage region into the first storage and execute the mobile payment software, which causes the processor to be configured to exchange the payment information with the transceiver.

2. The mobile payment apparatus according to claim 1, wherein the mobile payment software comprises mobile payment operating system software.

3. The mobile payment apparatus according to claim 2, wherein the mobile payment software further comprises at least one type of mobile payment application software.

4. The mobile payment apparatus according to claim 3, wherein the processor is further configured to:
   load one or more types of mobile payment application software of the at least one type of mobile payment application software from the memory to the first storage upon being triggered by the payment information exchanged between the processor and the transceiver; and
   execute the one or more types of mobile payment application software.

5. The mobile payment apparatus according to claim 2, wherein the SE further comprises a second storage configured to store a startup program for initiating the processor, and wherein the processor is further configured to:
   read the startup program from the second storage when the SE is powered on;
   load the mobile payment operating system software from the memory to the first storage under action of the startup program; and
   execute the mobile payment operating system software.

6. The mobile payment apparatus according to claim 1, wherein the payment information comprises:
   a mobile payment instruction that is transmitted from the communication peer end to the processor via the transceiver; and
   mobile payment data transmitted from the processor to the communication peer end via the transceiver in response to the mobile payment instruction.

7. The mobile payment apparatus according to claim 6, wherein the mobile payment data comprises data resulting from security processing, and wherein the security processing comprises at least one of data encryption or data integrity protection.

8. The mobile payment apparatus according to claim 7, wherein the processor is further configured to generate the data resulting from security processing.

9. The mobile payment apparatus according to claim 7, wherein the processor is further configured to generate original data, and wherein the SE is configured to perform the security processing on the original data to generate the data resulting from security processing.

10. The mobile payment apparatus according to claim 1, wherein the control performed by the at least one CPU on the at least one of the transceiver, the memory, or the SE comprises controlling of turning-on, turning-off, entry into or exit from a low power state or entry into or exit from a working state.

11. The mobile payment apparatus according to claim 1, wherein the transceiver is a NFC unit, wherein the communication peer end is a payment terminal, and wherein the NFC unit is configured to exchange the payment information with the payment terminal by executing a short distance radio communication protocol.

12. The mobile payment apparatus according to claim 11, wherein the NFC unit is located in the first semiconductor chip or is located in a fourth semiconductor chip in the mobile payment apparatus.

13. The mobile payment apparatus according to claim 1, wherein the transceiver is a mobile transceiver, wherein the communication peer end is a RAN, and wherein the mobile transceiver is configured to exchange the payment information with the RAN by executing a cellular radio communication protocol.

14. The mobile payment apparatus according to claim 13, wherein the mobile transceiver is located in the first semiconductor chip or is located in a fifth semiconductor chip in the mobile payment apparatus.

15. The mobile payment apparatus according to claim 1, wherein the SE is configured to:
   perform security verification on the mobile payment software after the processor loads the mobile payment software from the memory to the first storage; and
   instruct the processor to execute the mobile payment software after the security verification succeeds, wherein the security verification comprises at least one of security decryption or first hash check.

16. The mobile payment apparatus according to claim 15, wherein the SE is further configured to perform at least one type of processing in security encryption or first hash operation processing on update data to obtain processed update data, and wherein the processor is further configured to write the processed update data to the memory to update the mobile payment software.

17. The mobile payment apparatus according to claim 16, wherein the processor is further configured to perform second hash operation processing on the processed update data using a key to obtain data to be stored when the processor writes the processed update data to the memory, and wherein the memory is further configured to:
  perform second hash check on the data to be stored;
  obtain the processed update data after the second hash check succeeds; and
  update the mobile payment software using the processed update data.

18. The mobile payment apparatus according to claim 16, wherein the processor is further configured to send the processed update data to the at least one CPU when writing the processed update data to the memory, wherein the at least one CPU is further configured to:
  perform second hash operation processing on the processed update data in a trusted execution environment using a key to obtain data to be stored; and
  send the data to be stored to the memory, wherein the trusted execution environment is securely isolated from the general operating system software, and
  wherein the memory is further configured to:
  perform second hash check on the data to be stored;
  obtain the processed update data after the second hash check succeeds; and
  update the mobile payment software using the processed update data.

19. The mobile payment apparatus according to claim 18, wherein the SE further comprises a third storage, and wherein the processor is further configured to:
  write the processed update data to the third storage; and
  send a first interrupt request to the at least one CPU, and wherein the at least one CPU is further configured to read the processed update data from the third storage in response to the first interrupt request in the trusted execution environment.

20. The mobile payment apparatus according to claim 1, wherein the processor is further configured to:
  perform security verification on the mobile payment software after loading the mobile payment software from the memory to the first storage; and
  execute the mobile payment software after the security verification succeeds, wherein the security verification comprises at least one of security decryption or first hash check.

21. The mobile payment apparatus according to claim 20, wherein the processor is further configured to:
  perform at least one type of processing in security encryption or first hash operation processing on update data to obtain processed update data; and
  write the processed update data to the memory to update the mobile payment software.

22. The mobile payment apparatus according to claim 1, wherein the at least one CPU is further configured to execute common application software except for the mobile payment software.

23. The mobile payment apparatus according to claim 1, wherein the general operating system software executed by the at least one CPU is securely isolated from the SE, wherein the first semiconductor is a single semiconductor chip, and wherein the second semiconductor chip is a single semiconductor chip separate from the first semiconductor chip.

24. The mobile payment apparatus according to claim 1, wherein the processor is further configured to perform second hash operation processing on update data or an erase instruction using a key to obtain a processing result, and wherein the memory is further configured to:
  perform second hash check on the processing result;
  obtain the update data or the erase instruction after the second hash check succeeds; and
  update the mobile payment software using the update data or erase data that corresponds to the erase instruction from the memory according to the erase instruction.

25. The mobile payment apparatus according to claim 1, wherein the processor is further configured to send update data or an erase instruction to the at least one CPU, and wherein the at least one CPU is further configured to:
  perform second hash operation processing on the update data or the erase instruction in a trusted execution environment using a key to obtain a processing result; and
  send the processing result to the memory, wherein the trusted execution environment is securely isolated from the general operating system software, and wherein the memory is further configured to:
  perform second hash check on the processing result;
  obtain the update data or the erase instruction after the second hash check succeeds; and
  update the mobile payment software using the update data or erase data that corresponds to the erase instruction from the memory according to the erase instruction.

26. A semiconductor chip used in a mobile payment apparatus, comprising:
  a memory comprising:
    a secure storage region configured to store mobile payment software; and
    a common storage region configured to store general operating system software, wherein the secure storage region and common storage region are isolated from each other;
  a secure element (SE) comprising:
    a processor; and
    a first storage configured to provide memory space for executing the mobile payment software by the processor; and
  at least one central processing unit (CPU) coupled to the SE and the memory, wherein the SE and the at least one CPU are located in a first semiconductor chip in the mobile payment apparatus, wherein the memory is located in a second semiconductor chip in the mobile payment apparatus, wherein the first semiconductor is a single semiconductor chip, and wherein the second semiconductor chip is a single semiconductor chip separate from the first semiconductor chip, and wherein the at least one CPU is configured to read the general operating system software from the common storage region and execute the general operating system software, which causes the CPU to be configured to control the memory or the SE,
  wherein the processor is configured to load the mobile payment software from the secure storage region into the first storage and execute the mobile payment software, which causes the processor to be configured to exchange payment information with a transceiver in the mobile payment apparatus under action of the mobile payment software.

* * * * *